(12) United States Patent
Nielsen et al.

(10) Patent No.: US 7,705,489 B2
(45) Date of Patent: Apr. 27, 2010

(54) METHOD AND APPARATUS FOR PROVIDING UNINTERRUPTIBLE POWER

(75) Inventors: Henning Roar Nielsen, Brenderup (DK); Ranganathan Gurunathan, Bangalore (IN); Pothapragada Pavana Kumar, Bangalore (IN); Damir Klikic, Waltham, MA (US)

(73) Assignee: American Power Conversion Corporation, West Kingston, RI (US)

( * ) Notice: Subject to any disclaimer, the term of this patent is extended or adjusted under 35 U.S.C. 154(b) by 489 days.

(21) Appl. No.: 11/518,388

(22) Filed: Sep. 8, 2006

(65) Prior Publication Data

US 2008/0061628 A1 Mar. 13, 2008

(51) Int. Cl.
*H02J 7/00* (2006.01)
*H02J 9/00* (2006.01)

(52) U.S. Cl. ......................................................... 307/66
(58) Field of Classification Search ..................... 307/66
See application file for complete search history.

(56) References Cited

U.S. PATENT DOCUMENTS

| | | | |
|---|---|---|---|
| 4,823,247 A | 4/1989 | Tamoto | |
| 4,827,151 A | 5/1989 | Okado | |
| 4,831,508 A | 5/1989 | Hunter | |
| 4,937,505 A | 6/1990 | Deglon et al. | |
| 4,980,812 A | 12/1990 | Johnson, Jr. et al. | |
| 5,017,800 A | 5/1991 | Divan | |
| 5,126,585 A | 6/1992 | Boys | |
| 5,519,306 A | 5/1996 | Itoh et al. | |
| 5,654,591 A | 8/1997 | Mabboux et al. | |
| 5,684,686 A | 11/1997 | Reddy | |
| 6,483,730 B2 * | 11/2002 | Johnson, Jr. | ................ 363/123 |
| 6,661,678 B2 | 12/2003 | Raddi et al. | |
| 6,944,035 B2 * | 9/2005 | Raddi et al. | ................... 363/37 |
| 7,012,825 B2 | 3/2006 | Nielsen | |
| 7,091,625 B2 * | 8/2006 | Okusawa et al. | ............... 290/1 |
| 2002/0130648 A1 | 9/2002 | Raddi et al. | |
| 2004/0084967 A1 | 5/2004 | Nielsen | |
| 2004/0155526 A1 | 8/2004 | Naden et al. | |
| 2006/0238941 A1 | 10/2006 | Ingemi et al. | |

* cited by examiner

*Primary Examiner*—Fritz M Fleming
*Assistant Examiner*—Dru M Parries
(74) *Attorney, Agent, or Firm*—Lando & Anastasi, LLP

(57) ABSTRACT

At least one aspect is directed to an uninterruptible power supply that includes a first input having an input line connection and an input neutral connection to receive a first input voltage from a first voltage source, a second input to receive a second input voltage from a second voltage source, and a boost circuit configured to provide a positive output DC voltage with respect to the input neutral connection and a negative output DC voltage with respect to the input neutral connection in both a line mode of operation and a backup mode of operation. The power supply also includes a first connection circuit to couple the first input to the boost circuit in the line mode of operation, and a second connection circuit to couple the second input to the boost circuit in the backup mode of operation, the second connection circuit being configured to isolate the second voltage source from the input neutral connection in the line mode of operation.

24 Claims, 16 Drawing Sheets

METHOD AND APPARATUS FOR PROVIDING UNINTERRUPTIBLE POWER

BACKGROUND OF INVENTION

1. Field of Invention

Embodiments of the invention relate generally to power supplies and more specifically, at least one embodiment relates to a method and apparatus for generating an output voltage derived from an input voltage.

2. Discussion of Related Art

Uninterruptible power supplies (UPS) for providing power to critical loads are well known. FIG. 1 provides a block diagram of a typical on-line UPS 100 that provides regulated power as well as back-up power to a load 140. The UPS 100 includes a rectifier/boost converter 110, an inverter 120, a controller 130 and a battery 150. The UPS has inputs 112 and 114 to couple respectively to line and neutral of an input AC power source and has outputs 116 and 118 to provide an output line and neutral to the load 140.

In line mode of operation, under control of the controller, the rectifier/boost converter 110 receives the input AC voltage and provides positive and negative output DC voltages at output lines 120 and 122 with respect to a common or neutral line 124. In battery mode of operation, upon loss of input AC power, the rectifier/boost converter 110 generates the DC voltages from the battery 150. The common line 124 may be coupled to the input neutral 114 and the output neutral 118 to provide a continuous neutral through the UPS 100. The inverter 120 receives the DC voltages from the rectifier/boost converter 110 and provides an output AC voltage at lines 116 and 118.

Further details of the rectifier/boost converter 110 and the battery 150 are shown in FIGS. 2A and 2B with FIG. 2A showing the UPS in line mode of operation and FIG. 2B showing the UPS in battery mode of operation. The rectifier/boost converter 110 includes input diodes 160, 162, input capacitors 164, 166, relays 168 and 170, inductors 172 and 174, boost transistors 176 and 178, diode 177, output diodes 180, 182, and output capacitors 184, 186. In addition, the rectifier/boost converter includes a transistor 188 that, as described below functions as part of a buck-boost circuit in the battery mode of operation.

In line mode of operation, relays 168, 170 are configured as shown in FIG. 2A to couple an input AC line voltage at inputs 112, 114 to inductors 172 and 174, such that positive and negative rectified voltages are respectively provided to inductors 172 and 174. Inductor 172 operates in conjunction with transistor 176 and diode 180 as a positive boost circuit under the control of the controller 130 using pulse width modulation to provide a positive DC voltage across capacitor 184. Similarly, inductor 174 operates in conjunction with transistor 178 and diode 182 as a negative boost circuit under the control of the controller 130 using pulse width modulation to provide a negative DC voltage across capacitor 186. The controller may control operation of the boost circuits to provide power factor correction at the input of the uninterruptible power supply, with the input currents being sinusoidal with low total harmonic distortion and substantially in phase with the input voltage.

In battery or backup mode of operation, for example, upon failure of the AC voltage source, the relays 168, 170 are moved, under the control of the controller, to the positions shown in FIG. 2B to couple the battery 150 to inductors 172 and 174. In the battery mode of operation, the positive boost circuit operates as discussed above using the battery voltage to generate the DC voltage across capacitor 184. To generate the negative voltage across the capacitor 186 in battery mode, the transistor 188, under the control of the controller, in conjunction with inductor 174 and diode 182 functions as a buck-boost circuit with transistor 188 being cycled off and on. In one version, during each cycle, transistor 178 is turned on immediately prior to transistor 188 being turned on to reduce the voltage across transistor 188 at the time of turn-on to approximately the battery voltage. The drive signal to transistor 178 remains on for the duration of the on time of transistor 188. There is no current flow in transistor 178 due to the fact that the emitter of transistor 178 is at the battery voltage. When transistor 188 is turned off, transistor 178 is again forward biased and the inductor current flows through diode 177 and transistor 178. Transistor 178 stays on for 0.5 microseconds to allow transistor 188 to turn off totally, and is then turned off.

The UPS described above allows a single battery to be used in a dual DC bus (also referred to as a split DC bus) rectifier converter circuit. Other approaches utilize dual batteries or a split battery having a midpoint to generate the positive and negative bus voltages in battery mode of operation.

Another approach to using a single battery in a split DC bus rectifier converter circuit is described in U.S. Pat. No. 6,661,678 to Raddi et al. The Raddi patent describes approaches in which either a relay or a diode circuit is used to couple a single battery to dual DC buses in a UPS.

SUMMARY OF INVENTION

At least one aspect of the invention is directed to an improved uninterruptible power supply and method for providing uninterruptible power. The uninterruptible power supply includes a first input having an input line connection and an input neutral connection to receive a first input voltage from a first voltage source, a second input to receive a second input voltage from a second voltage source, a boost circuit configured to provide a positive output DC voltage with respect to the input neutral connection and a negative output DC voltage with respect to the input neutral connection in both a line mode of operation and a backup mode of operation, a first connection circuit to couple the first input to the boost circuit in the line mode of operation, and a second connection circuit to couple the second input to the boost circuit in the backup mode of operation, wherein the uninterruptible power supply is constructed and arranged to isolate the second voltage source from the input neutral connection in the line mode of operation.

In the uninterruptible power supply, the second voltage source may be a battery, and the uninterruptible power supply may include the battery. The uninterruptible power supply may include an output circuit coupled to the boost circuit to receive the positive output DC voltage and the negative output DC voltage and to provide an output AC voltage at an output having an output line connection and an output neutral connection. The uninterruptible power supply may be configured to provide an uninterrupted connection from the input neutral connection to the output neutral connection. The first connection circuit may include at least one relay. The boost circuit may have a positive input, a negative input and a neutral input, wherein the neutral input is coupled to the input neutral connection, and wherein the second connection circuit includes a first diode coupled between a positive terminal of the battery and the positive input and a second diode coupled between a negative terminal of the battery and the negative input. The uninterruptible power supply may further include a first relay coupled in parallel with the first diode and a second relay coupled in parallel with the second diode. The uninterruptible power supply may be configured to operate with an AC voltage source at the first input having a peak AC voltage that is less than the positive output DC voltage, and the battery may have a battery voltage that is less than the positive output DC voltage. The uninterruptible power supply may further include a battery charging circuit coupled to the battery, the battery charging circuit having a positive charging circuit and a negative charging circuit, wherein the positive charging circuit is configured to charge the battery during a positive portion of the first input voltage, and wherein the negative charging circuit is configured to charge the battery during a negative portion of the first input voltage. The uninterruptible power supply may be constructed and arranged to isolate the first voltage source from the boost circuit in a backup mode of operation and draw current from the second voltage source. The power supply may be constructed and arranged to simultaneously draw current from both the first voltage source and the second voltage source in a combined mode of operation.

A second aspect of the invention is also directed to an uninterruptible power supply the uninterruptible power supply includes a first input having an input line connection and an input neutral connection to receive a first input voltage from a first voltage source, a second input to receive a second input voltage from a second voltage source, a boost circuit configured to provide a positive output DC voltage with respect to the input neutral connection and a negative output DC voltage with respect to the input neutral connection in both a line mode of operation and a backup mode of operation, and means for coupling the second input to the boost circuit in the backup mode of operation and for isolating the second voltage source from the input neutral connection in the line mode of operation to prevent current flow from the second voltage source in the line mode of operation.

In the uninterruptible power supply, the second voltage source may be a battery, and the uninterruptible power supply may include the battery. The uninterruptible power supply may further include an output circuit coupled to the boost circuit to receive the positive output DC voltage and the negative output DC voltage and to provide an output AC voltage at an output having an output line connection and an output neutral connection. The uninterruptible power supply may be configured to provide an uninterrupted connection from the input neutral connection to the output neutral connection. The uninterruptible power supply may further include means for isolating the boost circuit from the first voltage source in the backup mode of operation. In the uninterruptible power supply, the boost circuit may have a positive input, a negative input and a neutral input, wherein the neutral input is coupled to the input neutral connection, and wherein the means for coupling includes a first diode coupled between a positive terminal of the battery and the positive input and a second diode coupled between a negative terminal of the battery and the negative input. The uninterruptible power supply may further include a first relay coupled in parallel with the first diode and a second relay coupled in parallel with the second diode. The uninterruptible power supply may be configured to operate with an AC voltage source at the first input having a peak AC voltage that is less than the positive output DC voltage, and the battery may have a battery voltage that is greater than the peak AC voltage and less than the positive output DC voltage. The uninterruptible power supply may further include means for charging the battery, and means for simultaneously drawing current from both the first voltage source and the second voltage source in a combined mode of operation.

Another aspect of the invention is directed to a method of providing power to a load. The method includes receiving input power at a line connection and a neutral connection from a first voltage source, rectifying the input power to produce a first rectified voltage at a first node during a positive portion of an input voltage wave and a second rectified voltage at a second node during a negative portion of the input voltage wave, in a line mode of operation, producing a positive DC voltage with respect to the neutral connection from the first rectified voltage and a negative DC voltage with respect to the neutral connection from the second rectified voltage, coupling a second voltage source to the first node and the second node using a connection circuit that is configured to isolate the second voltage source from the neutral connection in the line mode of operation.

The second voltage source may be a battery, and the method may further include detecting an outage of the first voltage source, and producing the positive DC voltage and the negative DC voltage from a voltage of the battery in a backup mode of operation. The method may further include producing an output AC voltage from the positive DC voltage and the negative DC voltage in both the line mode of operation and the backup mode of operation. The method may further include isolating the first voltage source from the first node and the second node in the backup mode of operation. The method may further include simultaneously drawing current from both the first voltage source and the second voltage source in a combined mode of operation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
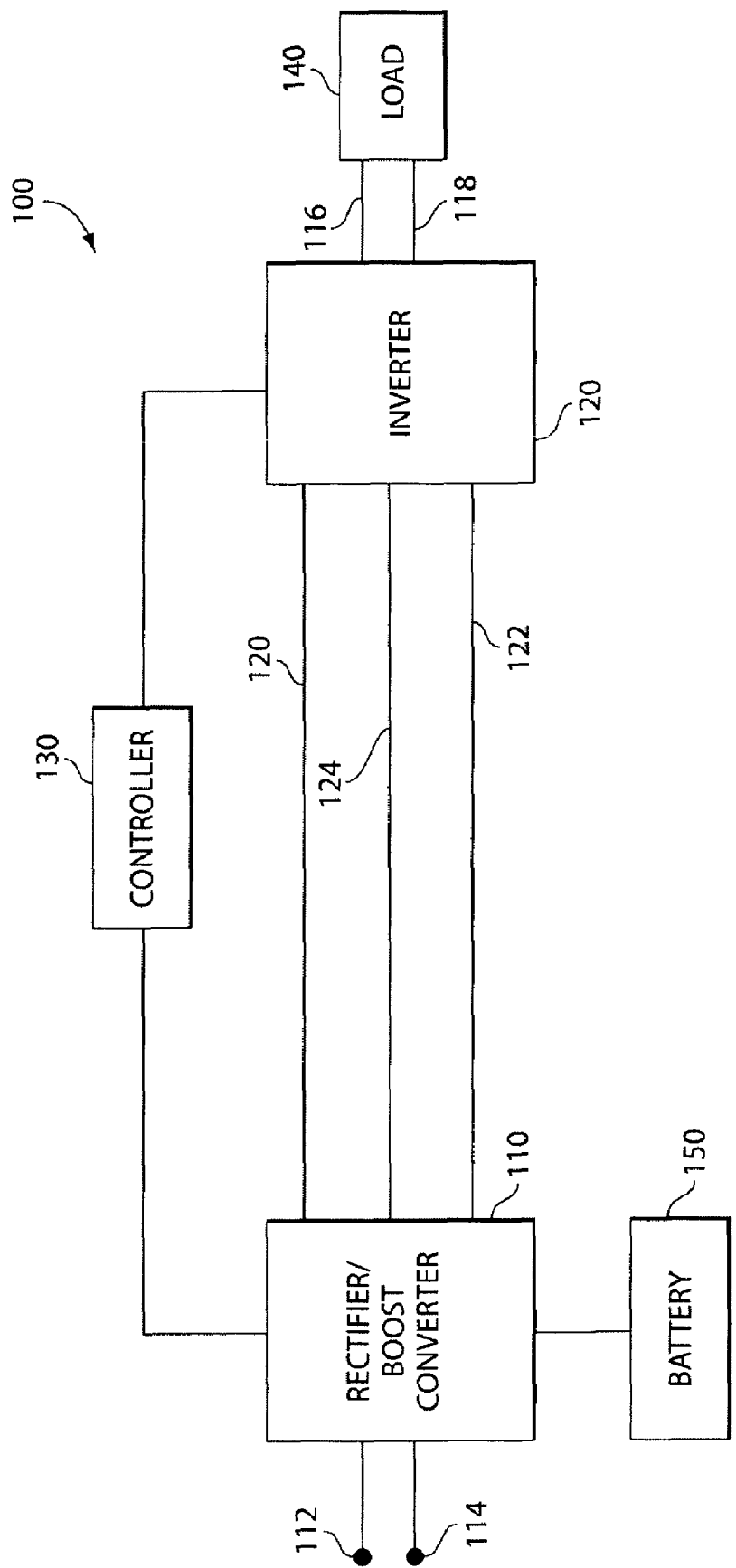
FIG. 1 is a functional block diagram of an uninterruptible power supply.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, prior approaches have provided for the use of a single battery in a split DC bus UPS. There are some drawbacks with the approaches discussed above. First, the use of relays or SCR's between the battery and the boost circuits typically requires that the DC bus capacitors have increased capacitance to maintain the bus voltages during switching of the SCR's upon loss of line power. Second, the SCR's require the use of gate circuits adding to the complexity and the cost of the UPS. In circuits using diodes, such as in U.S. Pat. No. 6,661,678 described above, the power factor correction circuit is typically disabled when the absolute value of the positive or negative instantaneous AC voltage is less than the battery voltage to prevent current from being drawn from the battery in line mode of operation. Because current is not drawn throughout the entire AC voltage waveform, the ability to provide an input current with very low total harmonic distortion is limited. This lowers the possible obtainable power factor. To help alleviate this problem, it is possible to use a battery of lower voltage, but the use of a lower voltage battery results in higher current draws resulting in the need to use higher rated, more expensive components. Still further, in at least some solutions of the prior art, in battery mode of operation, series diodes are used between at least one of the boost transistors and the neutral in the primary battery current path. These diodes have associated losses that reduce the efficiency of the uninterruptible power supply system.

Figure 3A:
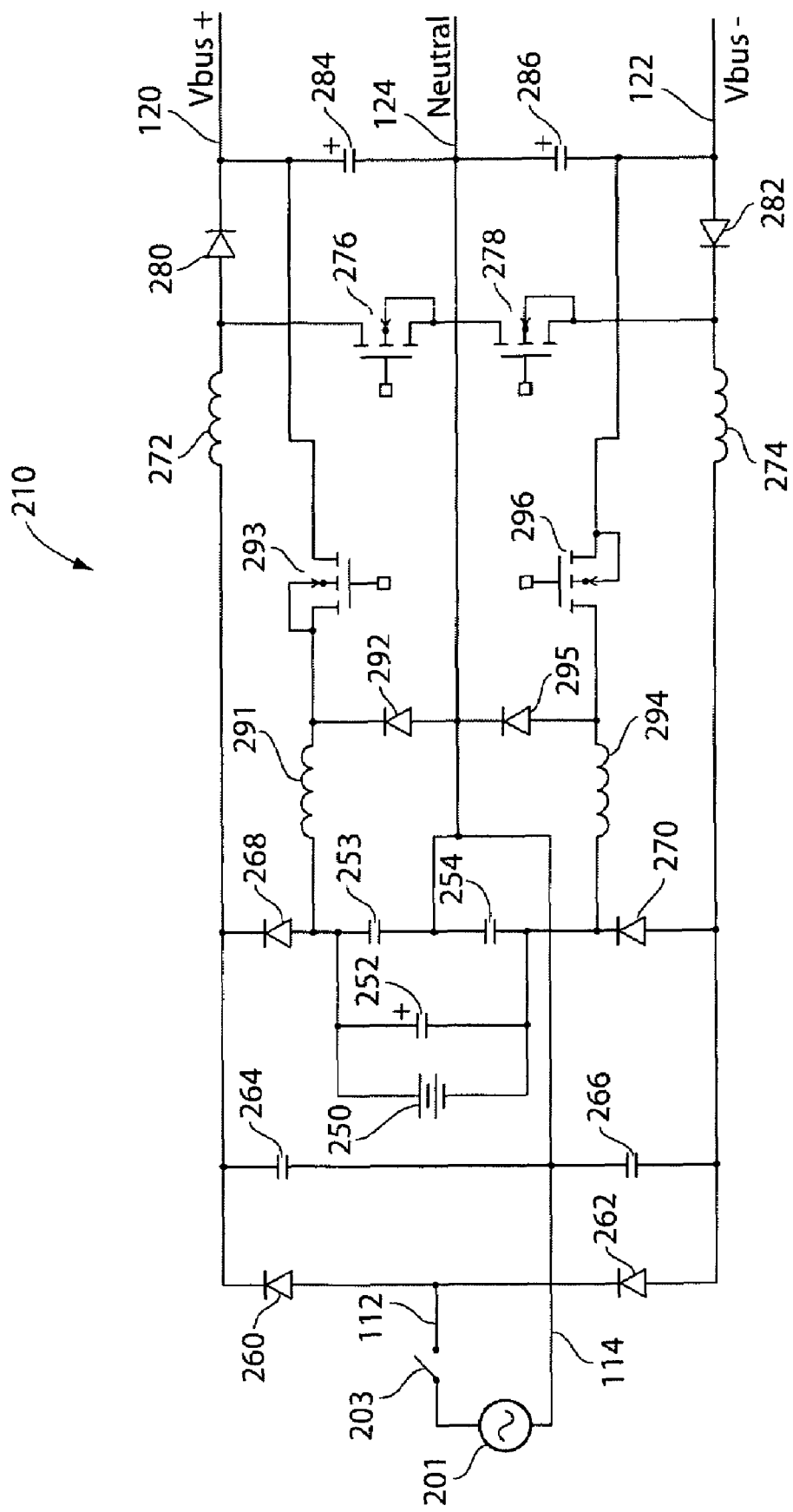
FIG. 3A is a schematic diagram of a rectifier/boost circuit in accordance with one embodiment of the invention.

As will now be described, in at least one embodiment of the present invention, a rectifier/boost converter circuit 210 that may be used, for example, in a UPS, such as that shown in FIG. 1, is configured to include an improved battery connection circuit to overcome at least one of the drawbacks discussed above. The rectifier/boost circuit 210 is shown in FIG. 3A coupled to an AC power source 201 through a relay 203. The rectifier/boost circuit 210 includes input diodes 260, 262, input capacitors 264, 266, battery connection diodes 268, 270, inductors 272, 274, boost transistors 276 and 278, output diodes 280, 282, and output capacitors 284, 286. In addition, the rectifier/boost circuit includes capacitors 252, 253 and 254 that along with diodes 268 and 270 form a battery connection circuit to couple the battery 250 to the boost transistors in battery mode of operation of rectifier/boost circuit 210. Capacitors 252, 253 and 254 may not be used in all embodiments, and primarily are used to reduce electromagnetic interference on battery wires and to reduce ripple current in the battery.

The rectifier/boost circuit also includes positive and negative battery charging circuits that charge the battery from power drawn from the output DC busses in line mode of operation. The positive battery charging circuit includes an inductor 291, a diode 292 and a transistor 293. The negative battery charging circuit includes an inductor 294, a diode 295 and a transistor 296. The rectifier/boost circuit may include current and voltage sensing circuits to detect operational characteristics of the rectifier/boost circuit to assist in control of the circuit by a controller, such as controller 130 shown in FIG. 1.

Figure 2A:
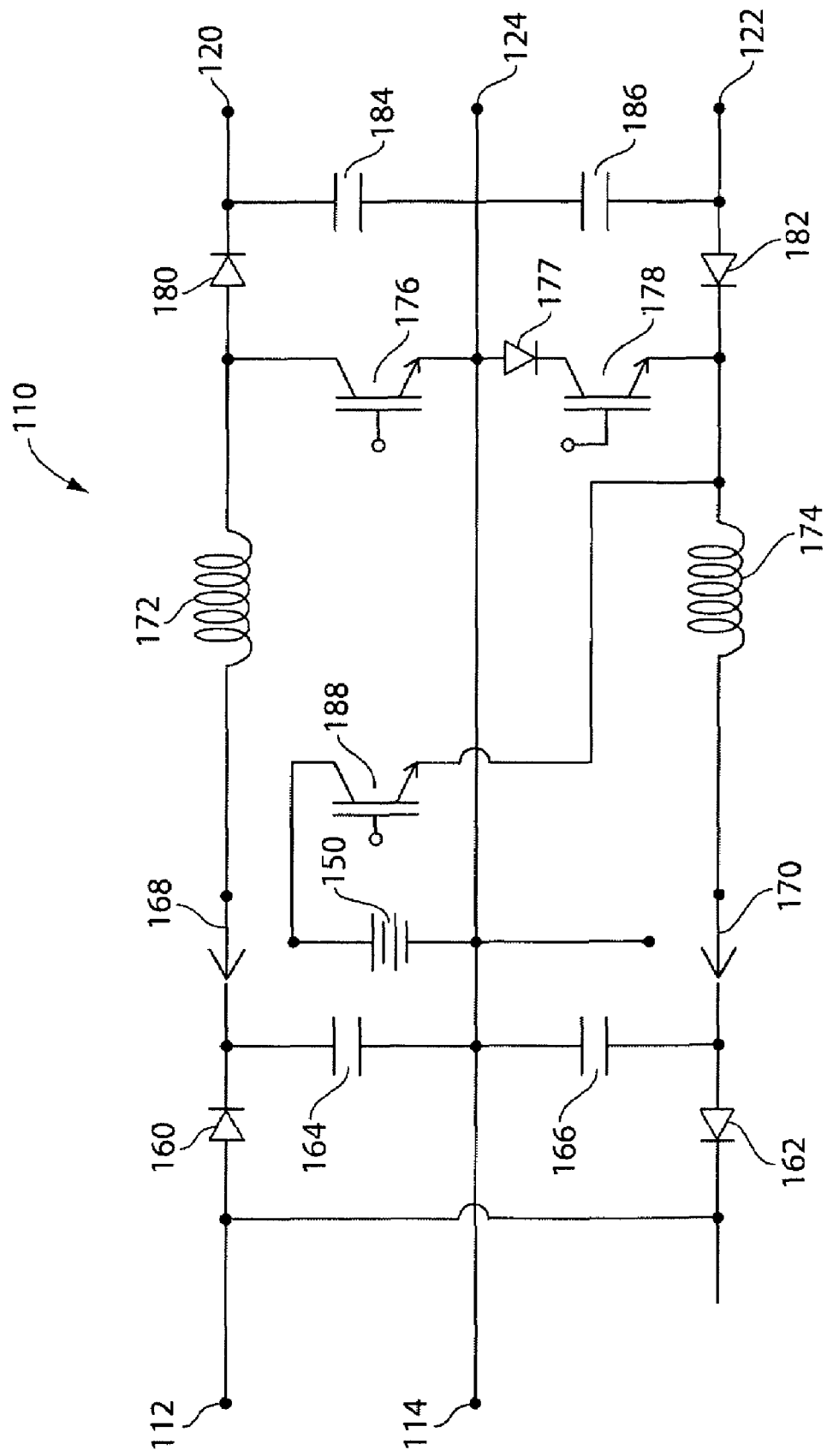
FIG. 2A is a schematic diagram of a prior art rectifier/boost converter that may be used in the uninterruptible power supply of FIG. 1 with the rectifier/boost converter in a first state of operation.
Figure 2B:
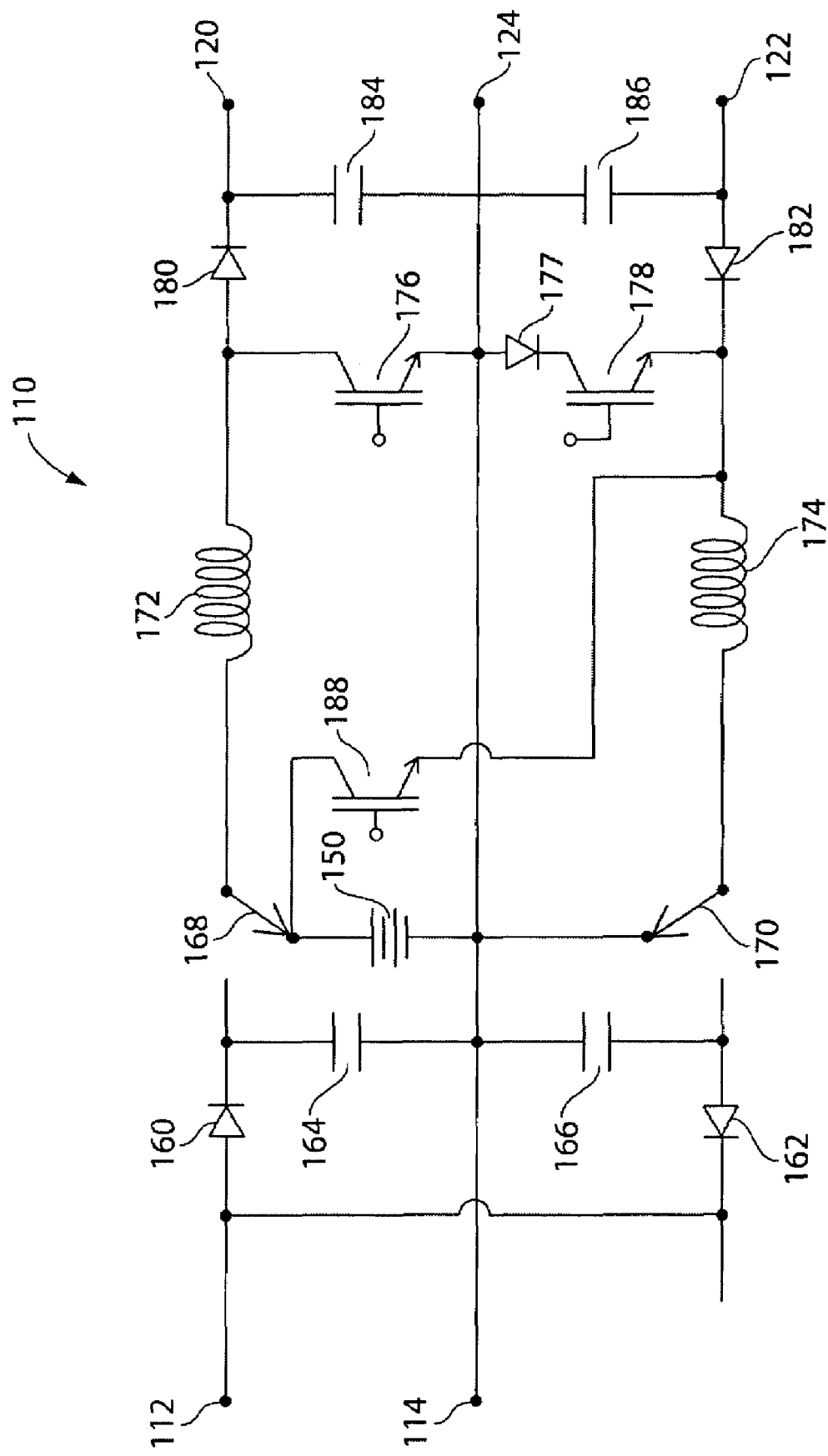
FIG. 2B is a schematic diagram of the rectifier/boost converter of FIG. 2A in a second state of operation.

The rectifier/boost circuit 210 of FIG. 3A is similar to the rectifier/boost circuit 110 shown in FIGS. 2A and 2B with a few exceptions. First, while the circuit 110 uses relays to couple the battery to the circuit in battery mode of operation, the circuit 110 uses diodes 268 and 270 in a manner described below. Second, in the circuit 110, the battery 150 has its negative terminal coupled to the neutral bus, while in circuit 210 there is no direct connection between the neutral bus and the battery 250. Finally, the battery charging circuit is shown for the circuit 210 while the battery charging circuit for the circuit 110 is not shown.

In line mode of operation, the relay 203 is in a closed position to couple the AC line voltage from the AC voltage source 201 to the boost inductors 272 and 274 through diodes 260 and 262, such that positive and negative rectified voltages are respectively provided to inductors 272 and 274. During periods of positive AC voltage of the AC voltage source, inductor 272 operates in conjunction with transistor 276 and diode 280 as a positive boost circuit under the control of a controller, such as controller 130, using pulse width modulation to provide a positive DC voltage at the positive DC bus 120 across capacitor 284. Similarly, inductor 274 operates in conjunction with transistor 278 and diode 282 as a negative boost circuit under the control of the controller using pulse width modulation to provide a negative DC voltage at the negative DC bus 122 across capacitor 286.

In the positive half cycle of the line voltage, transistor 278 remains off and during the negative half cycle of the line voltage, transistor 276 remains off. With the battery voltage selected appropriately, this ensures that no voltage will be drawn from the battery during line mode of operation as there will be no current path to the negative terminal of the battery. The battery voltage in one embodiment is selected to be lower than the bus voltage across each of the capacitors 284 and 286, to prevent current flow from the battery through diode 282, inductor 274 and diode 270, which might otherwise occur during the positive portion of the input AC voltage. In the positive half cycle of the line voltage, the potential of the battery will float in a negative direction until its positive terminal is at a voltage level below the instantaneous value of the AC line voltage, so that all input current to the positive boost circuit is drawn from the AC voltage source through diode 260 rather than from the battery through diode 268.

Figure 3B:
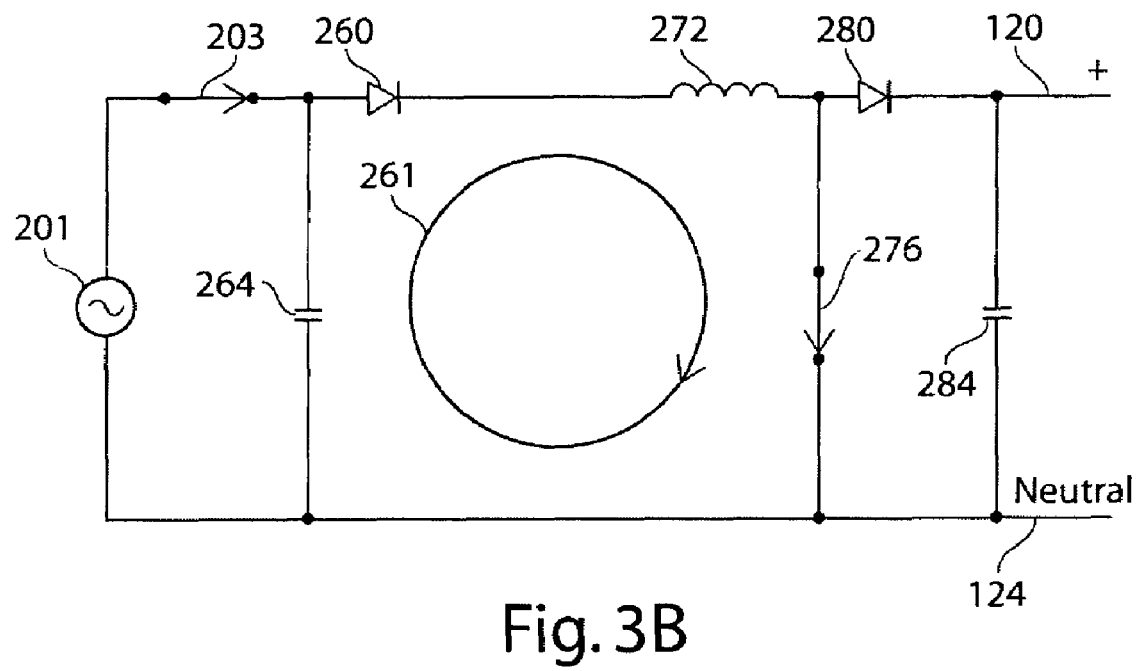
FIGS. 3B-3I are schematic diagrams indicating current paths in different modes of operation of the rectifier/boost circuit of FIG. 3A.
Figure 3C:
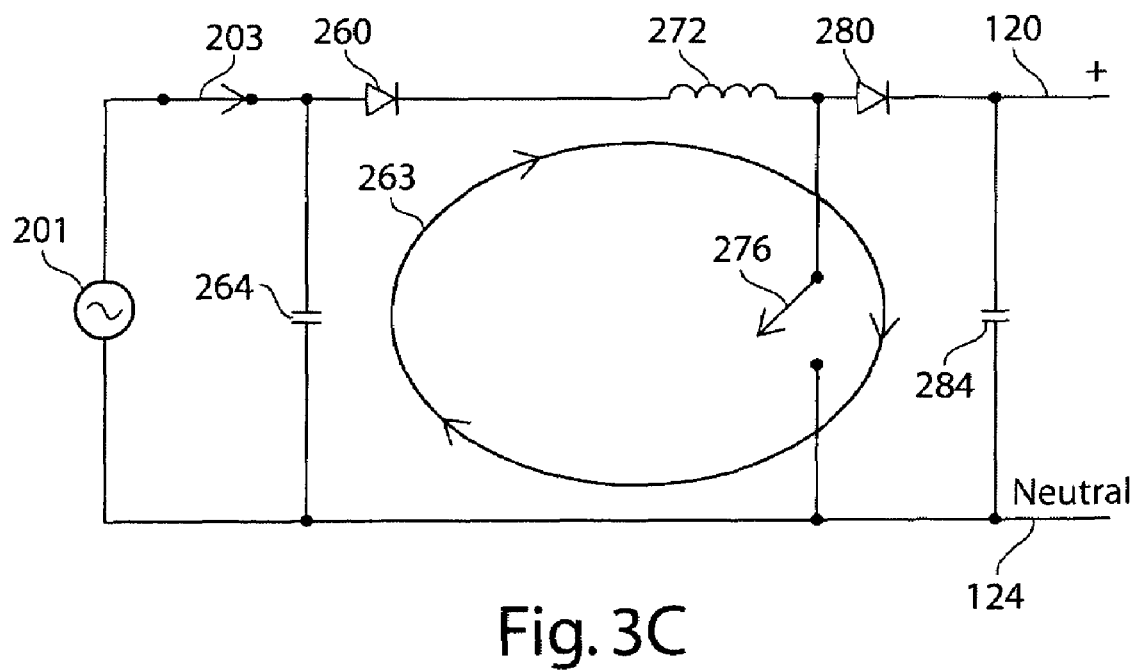

Operation in line mode will be further described with reference to FIGS. 3B-3E. FIGS. 3B and 3C show an equivalent circuit for the rectifier/boost circuit 210 in line mode of operation, during the positive half cycle of the input voltage waveform. As shown in FIG. 3B, transistor 276 is first closed to create a current path 261 from the AC source through diode 260, inductor 272, and transistor 276. Then, as shown in FIG. 3C, transistor 276 is opened, and capacitor 284 is charged through a current path 263 that includes the AC source, diode 260, inductor 272, diode 280 and capacitor 284. As understood by those skilled in the art, during the positive half cycle, operation of the circuit 210 alternates between the modes shown in FIGS. 3B and 3C to maintain the voltage across capacitor 284 at a predetermined level.

Figure 3D:
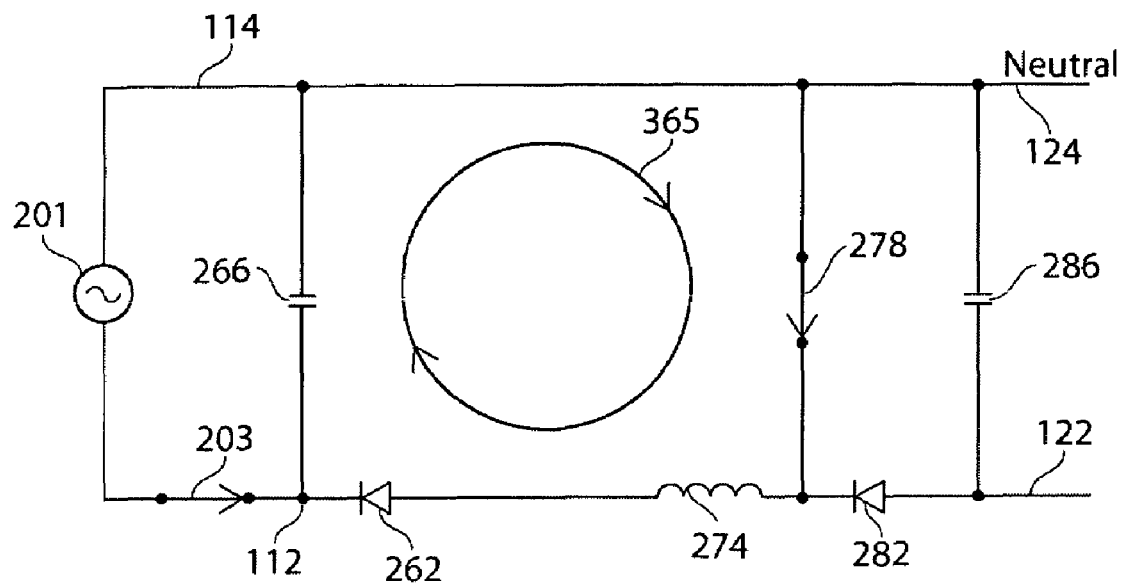
Figure 3E:
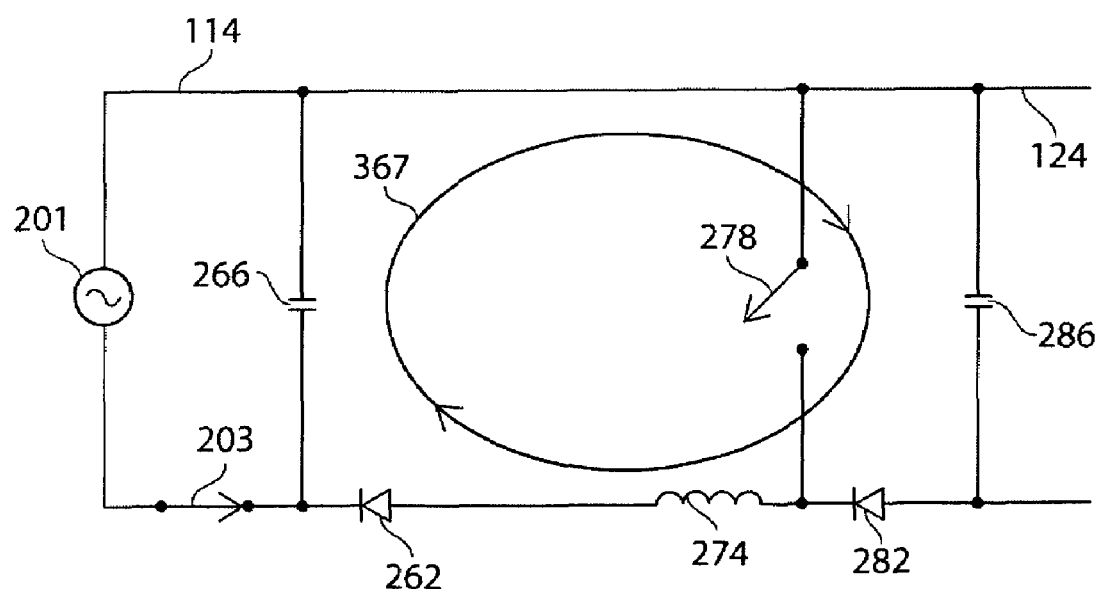

Similarly, FIGS. 3D and 3E show current paths 365 and 367 in line mode of operation during negative half cycles of the input AC voltage. First, as shown in FIG. 3D, transistor 278 is closed to create a current path 365 from the AC source through transistor 278, inductor 274 and diode 262, and next, as shown in FIG. 3E, transistor 278 is opened and the current follows a path 367 through capacitor 286, diode 282, inductor 274 and diode 262.

The rectifier/boost circuit 210 switches from line mode of operation to battery mode of operation when an out of tolerance condition (such as loss of power) of the AC voltage source occurs, and the relay 203 is switched under control of the controller from the closed position to the open position.

The open position of the relay 203 is shown in FIG. 3A. In battery mode of operation, the control of the positive and negative boost converter circuits is changed to a mode that allows power to be drawn from the battery to create the positive and negative bus voltages. As described below, in different embodiments of the invention, different control schemes may be used to control the draw of power from the battery in battery mode of operation.

Figure 3F:
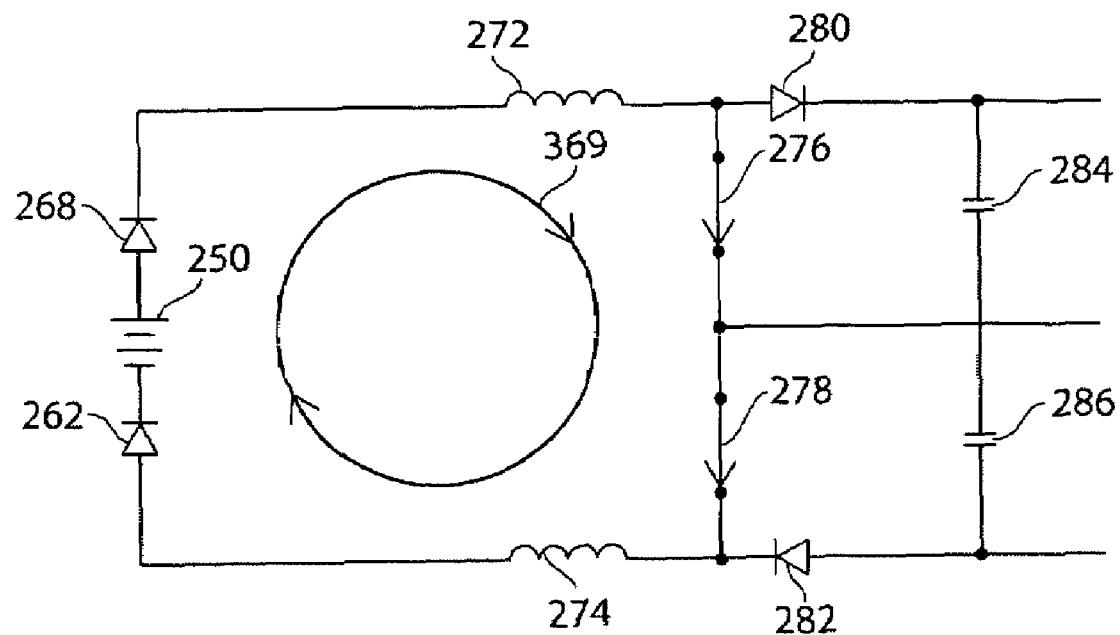
Figure 3G:
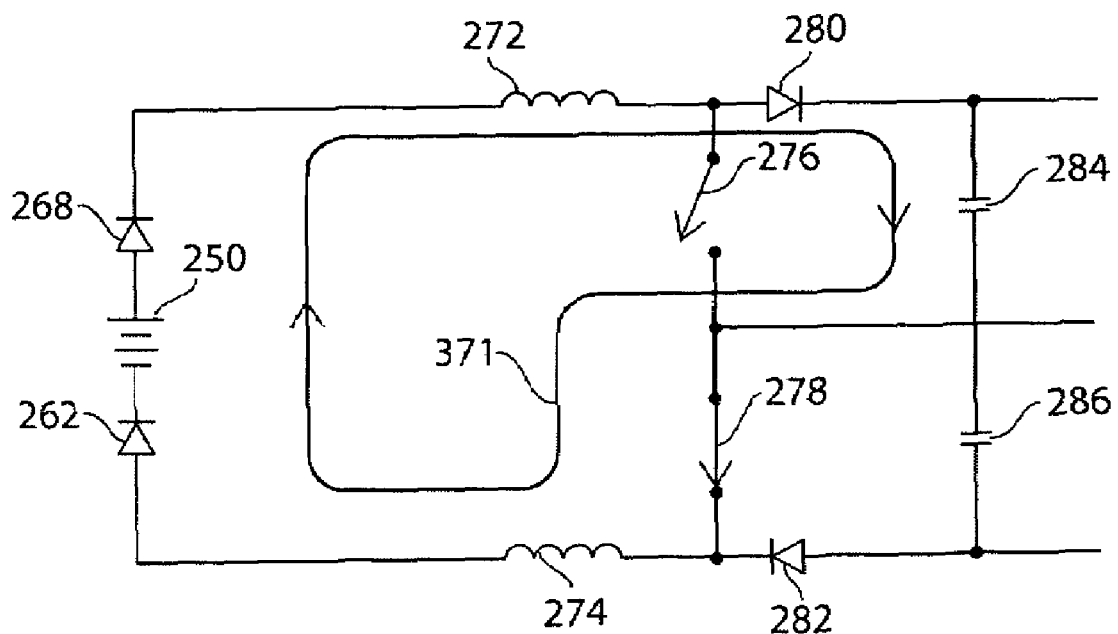

In a first scheme, in which the rectifier/boost circuit is used in a UPS having an output inverter like that described above with reference to FIG. 1, the draw of power from the battery in battery mode is synchronized with the output AC voltage waveform from the inverter, such that for the positive portion of the output AC waveform, the positive boost converter circuit is used to develop voltage across capacitor 284, and for the negative portion of the output AC waveform, the negative boost converter circuit is used to develop voltage across capacitor 286. More specifically, during the positive portion of the output waveform, a pulse width modulated control signal is applied to transistor 276 to generate the positive bus DC voltage across capacitor 284. During the positive portion, the negative boost transistor 278 is kept continuously on to provide a current path from the neutral line to the negative terminal of the battery through transistor 278, inductor 274 and diode 270. FIGS. 3F and 3G show equivalent circuits with current paths 369 and 371 during battery mode of operation for the positive portion of the output waveform. First, as shown in FIG. 3F, transistor 276 is closed creating a current path 369 from the battery through diode 260, inductor 272, transistors 276 and 278, inductor 274 and diode 262. Next, as shown in FIG. 3F, transistor 276 is opened and current takes a path 371 from the battery through inductor 272, diode 280, capacitor 284, transistor 278, inductor 274, and diode 262.

Figure 3H:
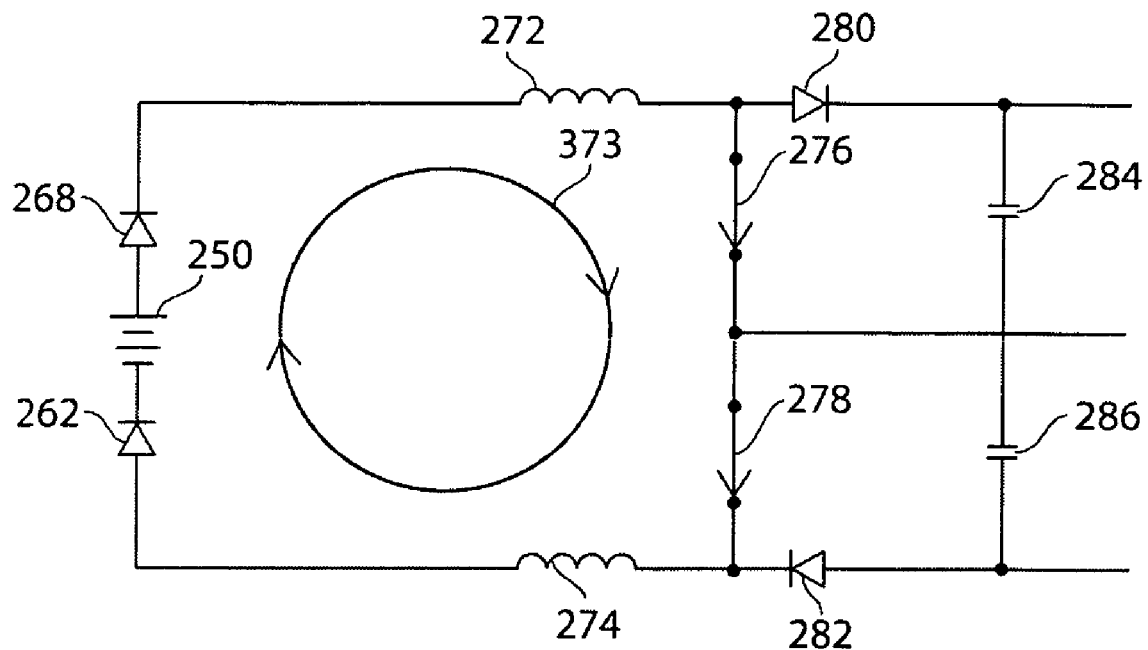
Figure 3I:
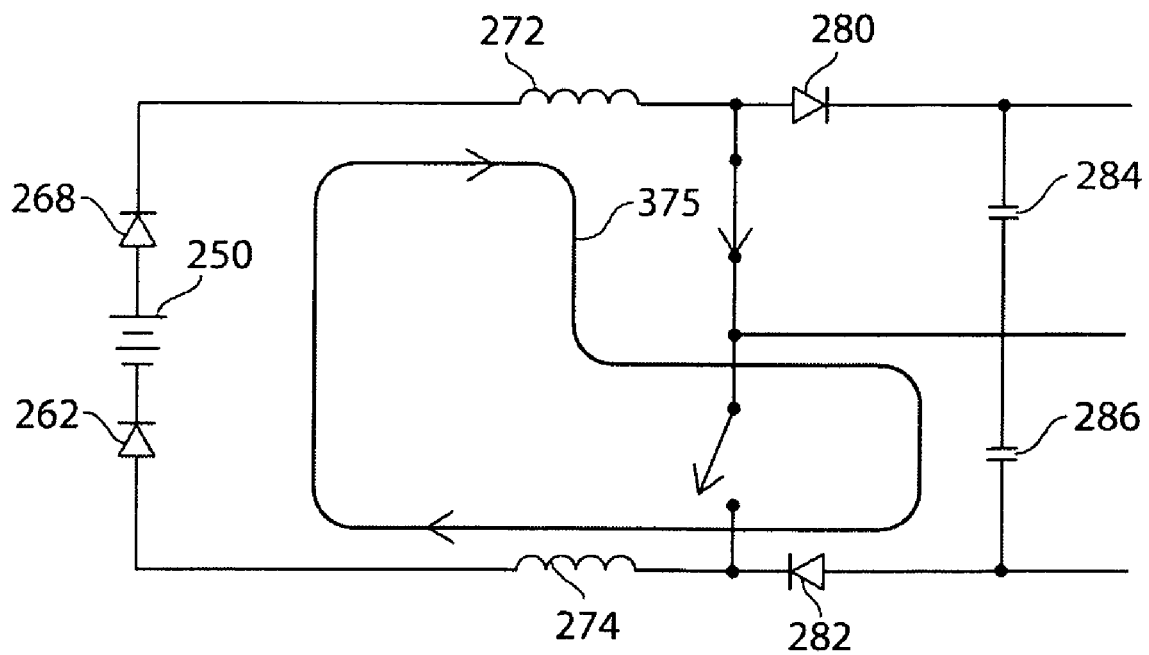

In a similar manner, during the negative portion of the output waveform, a pulse width modulated control signal is applied to transistor 278 to generate the negative DC voltage across capacitor 286. During the negative portion, the positive boost transistor 276 is kept continuously on to provide a current path between the neutral line and the positive terminal of the battery through transistor 276, inductor 272 and diode 268. FIGS. 3H and 3I show equivalent circuits with current paths 373 and 375 during battery mode of operation for the positive portion of the output waveform. First, as shown in FIG. 3H, transistor 278 is closed creating a current path 373 from the battery through diode 268, inductor 272, transistors 276 and 278, inductor 274 and diode 262. Next, as shown in FIG. 3I, transistor 276 is opened and current takes a path 375 from the battery through inductor 272, transistor 277, capacitor 286, diode 282, inductor 274, and diode 262.

In at least one embodiment, precautions may be taken to reduce undesirable high peak currents through transistors 276 and 278 as they are switched to the continuously on state in battery mode of operation. The high peak currents may occur due to discharging of capacitors 253, 254, 264 and 266 when the transistors are turned continuously on. More specifically, when transistor 278 is turned continuously on, capacitor 254 may be discharged through transistor 278, inductor 274 and diode 270. Also capacitor 266 may be discharged through transistor 278, and inductor 274. In a similar manner, capacitors 253 and 264 may be discharged through transistor 276 when transistor 276 is turned continuously on.

In one embodiment to prevent the high peak current, transistors 276 and 278 may be controlled by the controller to limit the current flow through the transistors. The current may be limited by implementing current control circuits with each of the transistors, or alternatively using digital control in the controller 130. The current control circuits (or controller) vary the pulse width modulation signals to the transistors (when in the PWM mode) such that the current in the associated inductor (inductor 272 for transistor 276 and inductor 274 for transistor 278) follow a reference current signal. The current in the non-PWM transistor can then be controlled to limit the current to a value that is somewhat higher than that of the reference current signal to limit the amount of current through the transistor due to discharge of one of the capacitors.

Figure 4:
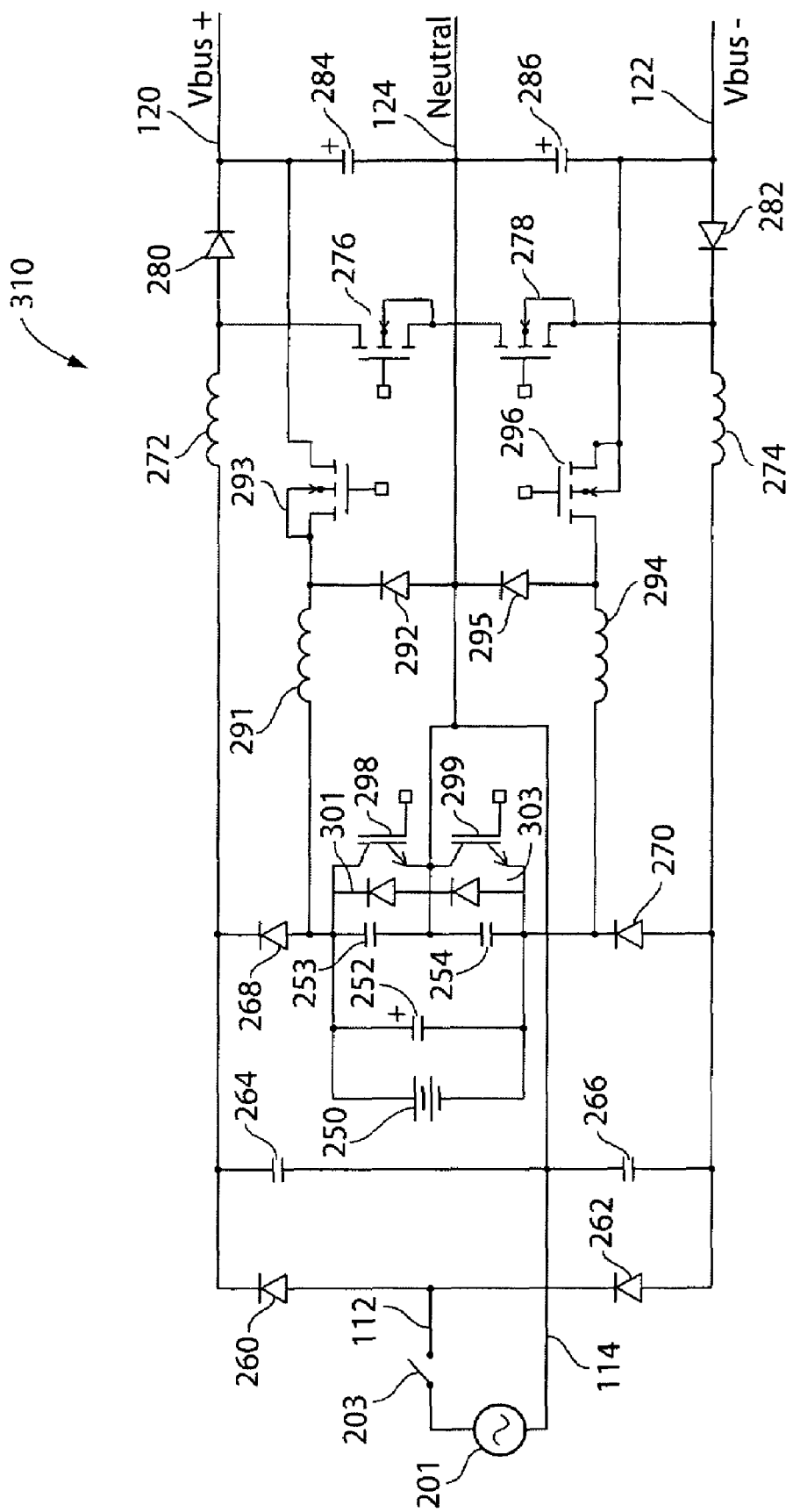
FIG. 4 is a schematic diagram of a rectifier/boost circuit in accordance with another embodiment of the invention.

In another embodiment, to limit current during battery mode of operation in the boost inductors and transistors, additional transistors may be added across each of capacitors 253 and 254. A rectifier/boost circuit 310 having the added transistors 298 and 299 is shown in FIG. 4. The rectifier boost/circuit 310 is substantially similar to rectifier/boost circuit 210 with the exception that in the circuit 310, the transistors 298 and 299 and associated anti-parallel diodes 301 and 303 have been added across respectively capacitors 253 and 254. Circuit 310 operates in a manner similar to circuit 210 described above with the exception that each of transistors 298 and 299 is controlled in battery mode of operation to turn on when the voltage across its associated capacitor (253 or 254) is discharged to zero. The anti-parallel diodes 301 and 303 are used to ensure that transistors 298 and 299 do not have a negative voltage across them. Such a negative voltage could be harmful, when, for example, the transistors are implemented using IGBT's. The anti-parallel diodes may be implemented using the internal body diode of its associated transistor when MOSFET transistors are used, or they may be implemented using a co-packed device that includes a diode.

More specifically, in battery mode of operation, as discussed above, during the positive portion of the output AC waveform, the positive boost circuit (inductor 272, transistor 276 and diode 280) is controlled in a pulse width mode of operation, and transistor 278 remains on to provide a current return path to the negative terminal of the battery. In the embodiment shown in FIG. 4, after capacitor 254 is discharged to a voltage close to zero (due to transistor 278 being on) transistor 299 is turned on. The return path for the current through the positive boost circuit is then through transistor 299, thereby limiting the total rms current through transistor 278, inductor 274 and diode 270 during the positive half-cycle of the output voltage waveform. Similarly, during the negative half-cycle of the output voltage waveform, when the negative boost circuit (inductor 274, transistor 278 and diode 282) is operating in pulse width mode, transistor 298 is turned on once capacitor 253 is discharged to a voltage close to zero. In another control scheme used with the embodiment shown in FIG. 4, each of transistors 298 and 299 may be turned on at the same time that its corresponding boost transistor 276 and 278 is turned on to discharge the capacitors. In another scheme, the battery charging circuit (which is described in further detail below) is operated as a bidirectional power converter to discharge the capacitors 253 and 254 while further charging one of capacitors 284 and 286.

Figure 5:
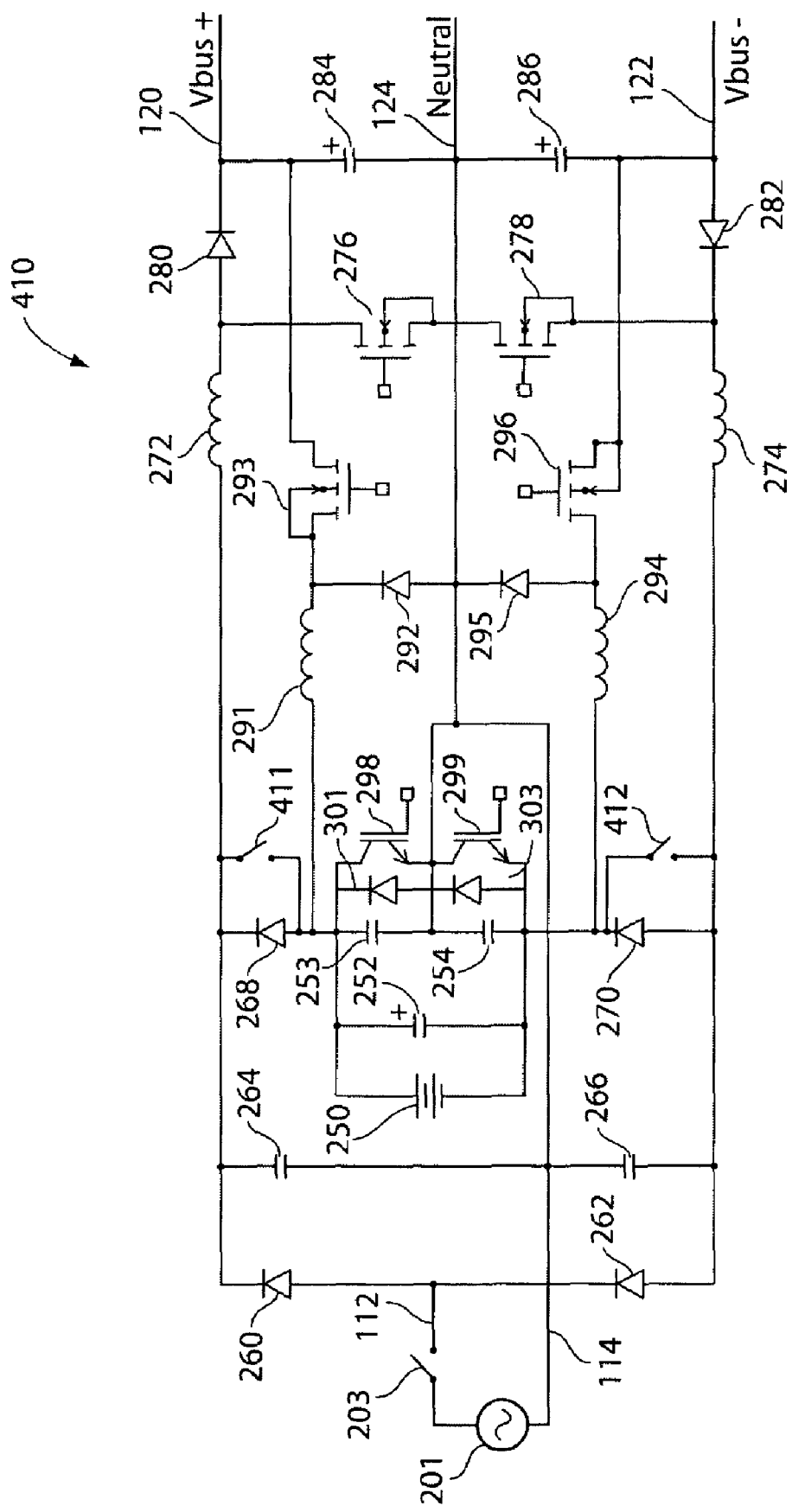
FIG. 5 is a schematic diagram of a rectifier/boost circuit in accordance with yet another embodiment of the invention.

In another embodiment, a rectifier/boost circuit 410 includes relays 411 and 412 that may be used to lower losses of the circuit when operating in battery mode of operation. The rectifier/boost circuit having the added relays 411 and 412 is shown in FIG. 5. The rectifier/boost circuit 410 is substantially similar to rectifier boost circuits 210 and 310 described above with the exception that in the circuit 410, the relays 411 and 412 have been added respectively across diodes 268 and 270. The circuit 410 includes transistors 298 and 299, however, in other embodiments, these transistors do not need to be included. Circuit 410 operates in a manner similar to circuits 210 and 310 described above with the exception that when entering battery mode, shortly after the opening of relay 203, each of relays 411 and 412 is controlled to close under the control of the controller. The closing of the relays during battery mode of operation avoids sustained conduction losses in diodes 268 and 270. In one embodiment, during operation of the circuit 410 in battery mode, upon return of line power, the relays 411 and 412 are opened prior to the closing of relay 203. The relays 411 and 412 may be implemented using individual relays or in one embodiment may be implemented using a common two-pole relay with a first set of contacts of the relay coupled across diode 268 and a second set of contacts of the relay coupled across diode 270.

Figure 6A:
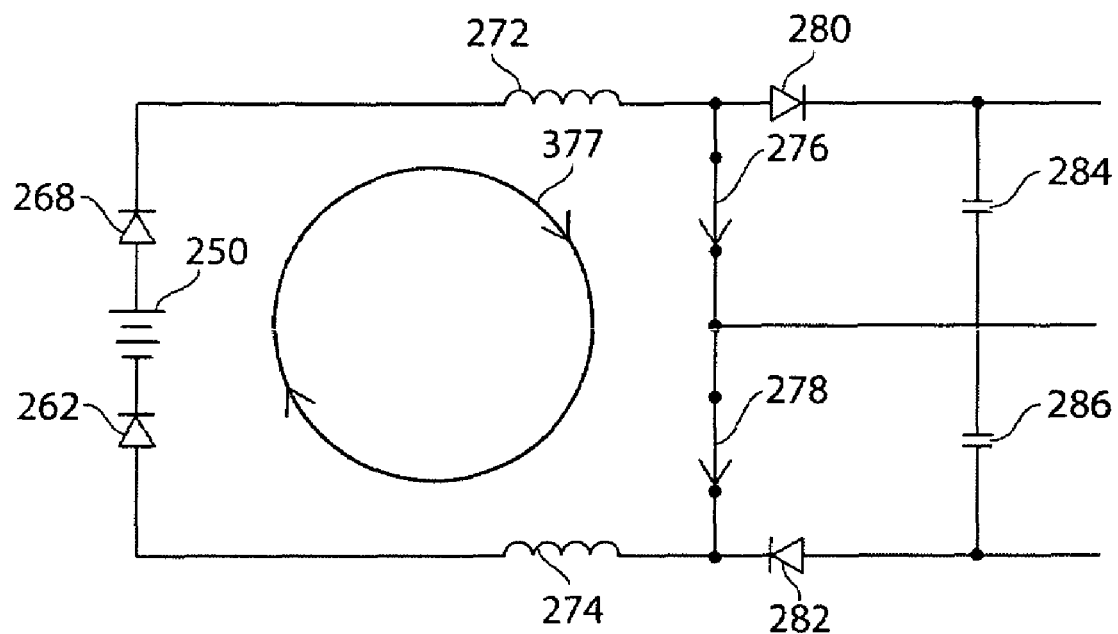
FIGS. 6A and 6B are schematic diagrams indicating current paths using an alternative control scheme in a battery mode of operation of the rectifier/boost circuit of FIG. 3A.
Figure 6B:
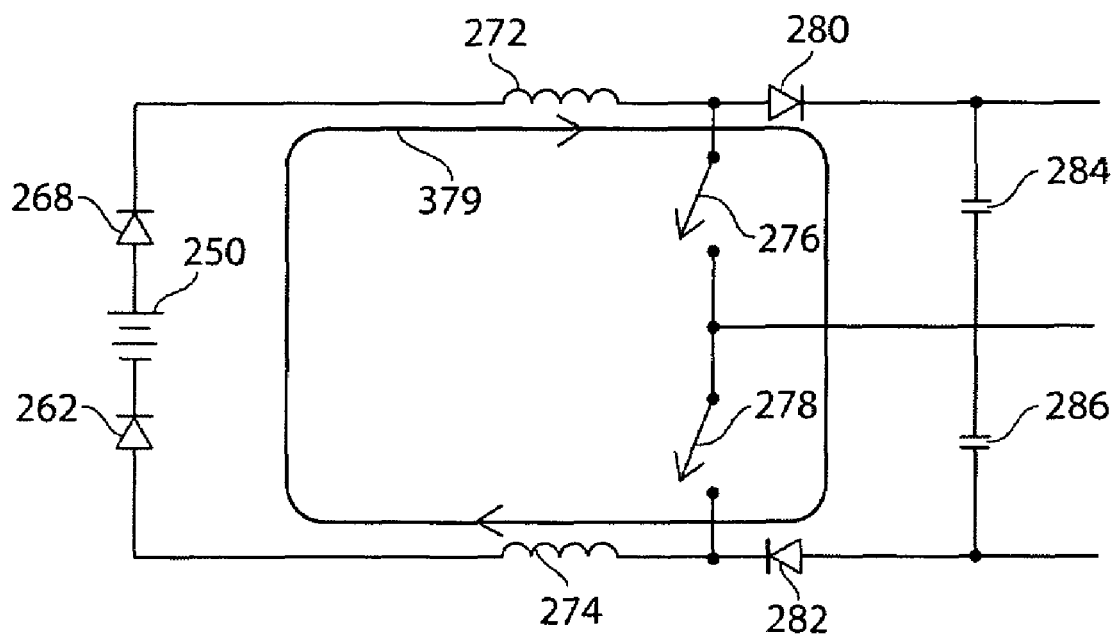

As will now be described, in another embodiment, a different control scheme is provided for controlling the operation of the rectifier boost circuit 210 in battery mode of operation. In general, in this embodiment, both transistors 276 and 278 are constantly switching and there is a substantially constant power flow to each of the bus capacitors 284, 286. Current paths in this control scheme will now be described with reference to FIGS. 6A and 6B. As shown in FIG. 6A, in a first stage of operation in battery mode, current follows path 377 through diode 268, inductor 272, transistor 276, transistor 278, inductor 274, and diode 262. Next, in a second stage of operation as shown in FIG. 6B, current follows a path 379 to charge capacitors 284 and 286. Current path 377 starts with the battery 250 and goes through diode 268, inductor 272, diode 280, capacitors 284 and 286, diode 282, inductor 274 and diode 262.

One advantage of the second control scheme is that the battery will stay at a relatively constant voltage level, so there is no need to consider special precautions with regard to the discharging of capacitors 253 and 254. The first control scheme can be beneficial by having switching losses in each of the boost transistors 276, 278 during only half of the operational time. For embodiments employing the second control scheme, the transistors 298 and 299 are not used, however, the relays 411 and 412 can be used to reduce conduction losses in the diodes.

As briefly discussed above, transistors 293, 296, diodes 292, 295 and inductors 291 and 294 are used in a charging circuit to charge the battery 250 in line mode of operation of the rectifier/boost circuit 210. More specifically, inductor 291, diode 292 and transistor 293 are used to implement a positive charging circuit and inductor 294, diode 295 and transistor 296 are used to implement a negative charging circuit. Each of the positive and negative charging circuits are controlled as buck converters to provide a regulated voltage across the battery. During the positive half cycle of the line voltage, the negative charging circuit is used to charge the battery 250. The transistor 296 is switched on and off under control of the controller using pulse width modulation to provide a controlled current and voltage to the battery. When the transistor 296 is on, current flows through a path that includes diode 292, inductor 291, battery 250, inductor 294 and transistor 296. When the transistor is turned off, inductors 291 and 294 discharge through the battery in a path that includes inductor 291, battery 250, inductor 294, diode 295 and diode 292.

In a similar manner, during the negative half cycle of the line voltage, the positive charging circuit is used to charge the battery 250. The transistor 293 is switched on and off under the control of the controller using pulse width modulation to provide a controlled current and voltage to the battery. When the transistor 293 is on, current flows through a path that includes transistor 293, inductor 291, battery 250, inductor 294 and diode 295. When the transistor is turned off, inductors 291 and 294 discharge through the battery in a path that includes inductor 291, battery 250, inductor 294, diode 295 and diode 292.

A particular advantage of the charging circuitry described above is that dual charging circuits are provided to allow charging of the battery during both the positive and negative half cycles of the input AC voltage waveform. In addition, in the dual charging circuits the use of the same two inductors in both the positive and negative charging circuits allows the size of each inductor to be reduced.

In other embodiments, other types of charging circuits may be used, for example, a transformer-coupled switched mode power converter may used. In such an embodiment, the converter can be coupled directly across the battery as the transformer provides galvanic isolation that allows the charging circuit to effectively charge the battery even though the battery potential is moving with respect to the neutral during line mode of operation.

In another embodiment, boost/rectifier circuits described above are controlled to simultaneously draw power from both line and battery. The waveform drawn from the line may be controlled to be sinusoidal to obtain substantially uniform power factor, and the current drawn from the battery may at the same time be substantially ripple-free DC current. In at least one version, the amount of power drawn from line and from battery can be controlled individually, so that the total power input can be any fractional mix of power from the two sources.

The ability to draw power from both sources provides a number of benefits. First, in transferring from battery operation to line operation, a smooth transition can be used where line current is increased gradually from zero to full current over a specific period of many line cycles. The gradual transfer can help to reduce or eliminate surges in current. Such surges in current may cause unstable voltage or frequency from the source, particularly if the source is a diesel generator or equivalent.

Another benefit of the simultaneous power draw is that battery current can be used to supplement line current during a temporary overload to avoid tripping of an AC circuit breaker or fuse. In one version, when line current exceeds a given value, a UPS containing embodiments of the invention are controlled to simultaneously draw current from the battery and from the AC line to limit the current draw from the line source.

Still another benefit of simultaneous power draw is that during low line voltage scenarios a UPS can be controlled to draw battery current as well as line current to prevent current overloads, while allowing some power to be drawn from the AC line to prevent rapid discharging of batteries.

In one embodiment, to achieve simultaneous power draw, in respectively positive and negative half cycles, one of the two boost circuits of the boost rectifier 210 is controlled to draw current with a waveform that includes an AC portion (from a line source) and a DC portion (from battery), while the opposite booster is controlled to draw only a DC portion (from battery). Ideally, the DC portions are equal. In at least one version, the battery charger is turned off during simultaneous current draw, with components 291, 292, 293, 294, 295 and 296 off.

Figure 7A:
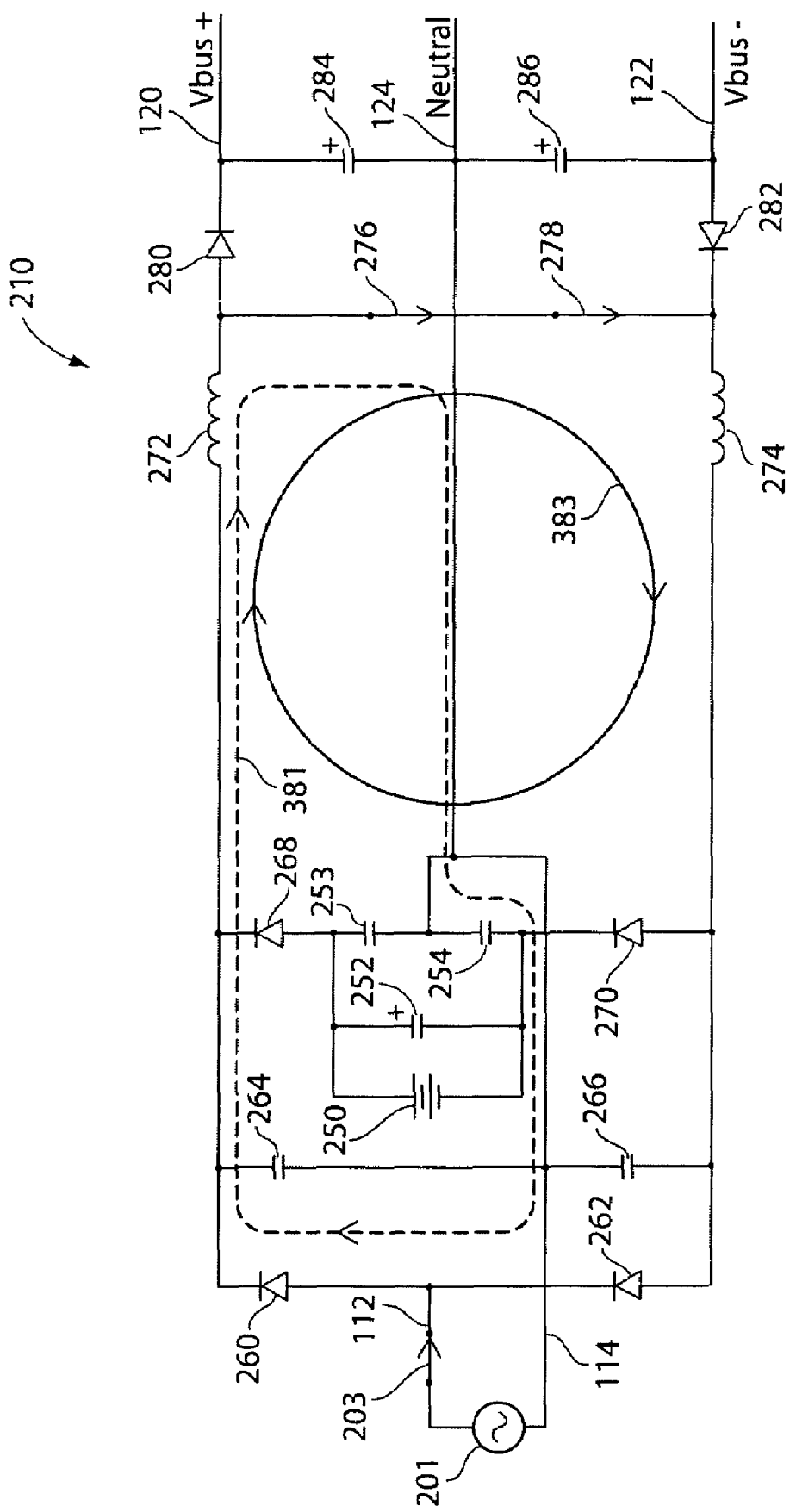
FIGS. 7A-7D are schematic diagrams indicating current paths during an alternative mode of operation of the rectifier/boost circuit of FIG. 3A.
Figure 7B:
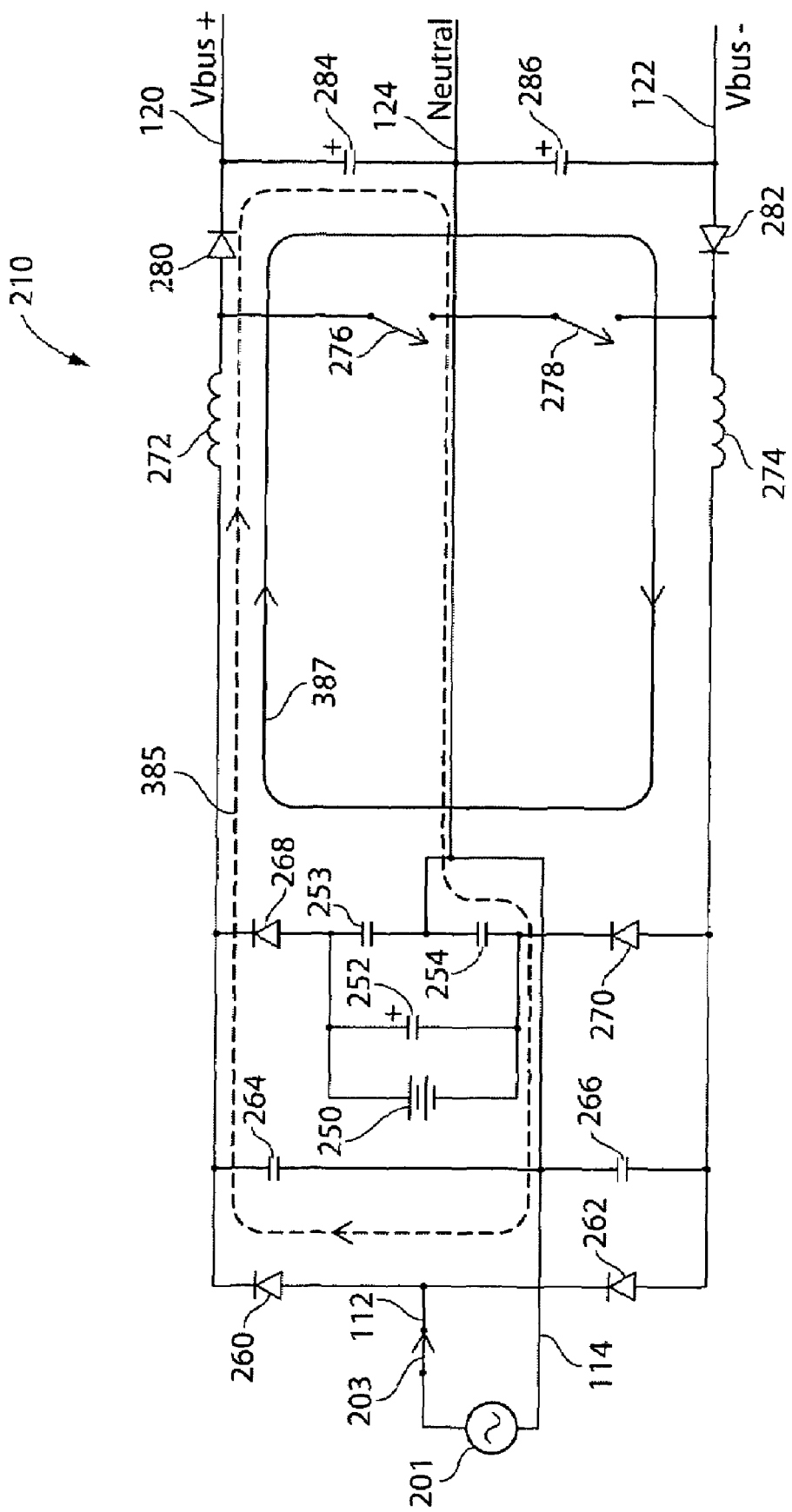

Current paths in the boost rectifier circuit 210 for simultaneous power draw from battery and a line source will now be described with reference to FIGS. 7A-7D. As in the embodiments described above, transistors 276 and 278 are turned on and off using pulse width modulation control to regulate the voltage across bus capacitors 284 and 286. FIG. 7A shows a first AC current path 381 (with dashed lines) and a first DC current path 383 (with solid lines) for simultaneous operation for a positive portion of the input AC waveform with transistors 276 and 278 closed. In this mode, AC current follows a path 381 from the AC source through diode 260, inductor 272, transistor 276 and back to the AC source. In this mode DC current follows a path 383 from the battery through diode 268, inductor 272, transistor 276, transistor 278, inductor 274, and diode 270. FIG. 7B shows a second AC current path 385 (with dashed lines) and a second DC current path 387 (solid lines) for simultaneous operation for the positive portion of the input AC waveform with transistors 276 and 278 opened. In this mode, AC current follows a path 385 from the AC source through diode 260, inductor 272, diode 280, capacitor 284 and back to the AC source. In this mode DC current follows a path 387 from the battery through diode 268, inductor 272, diode 280, capacitor 284, capacitor 286, diode 282, inductor 274, and diode 270.

Figure 7C:
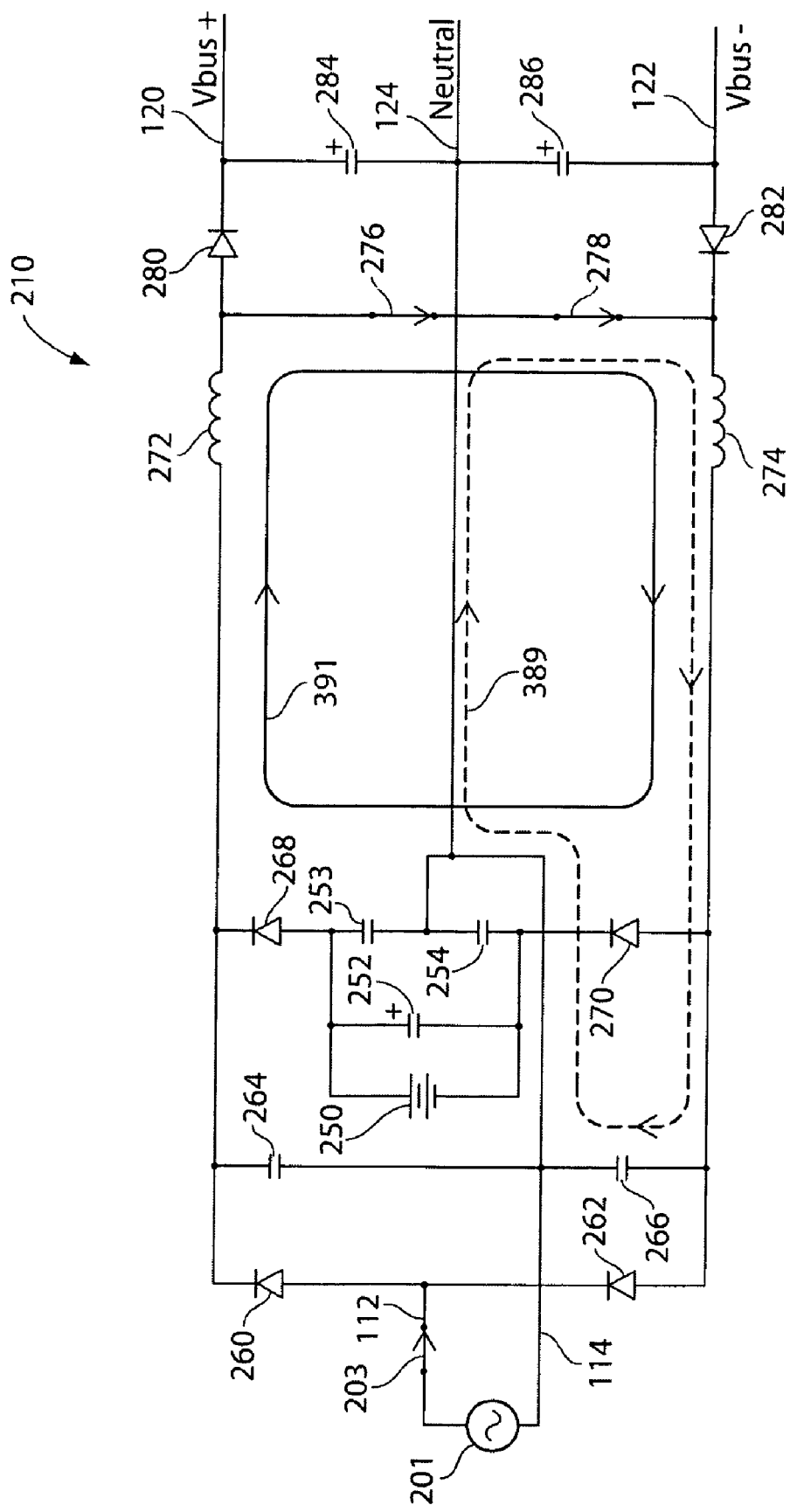
Figure 7D:
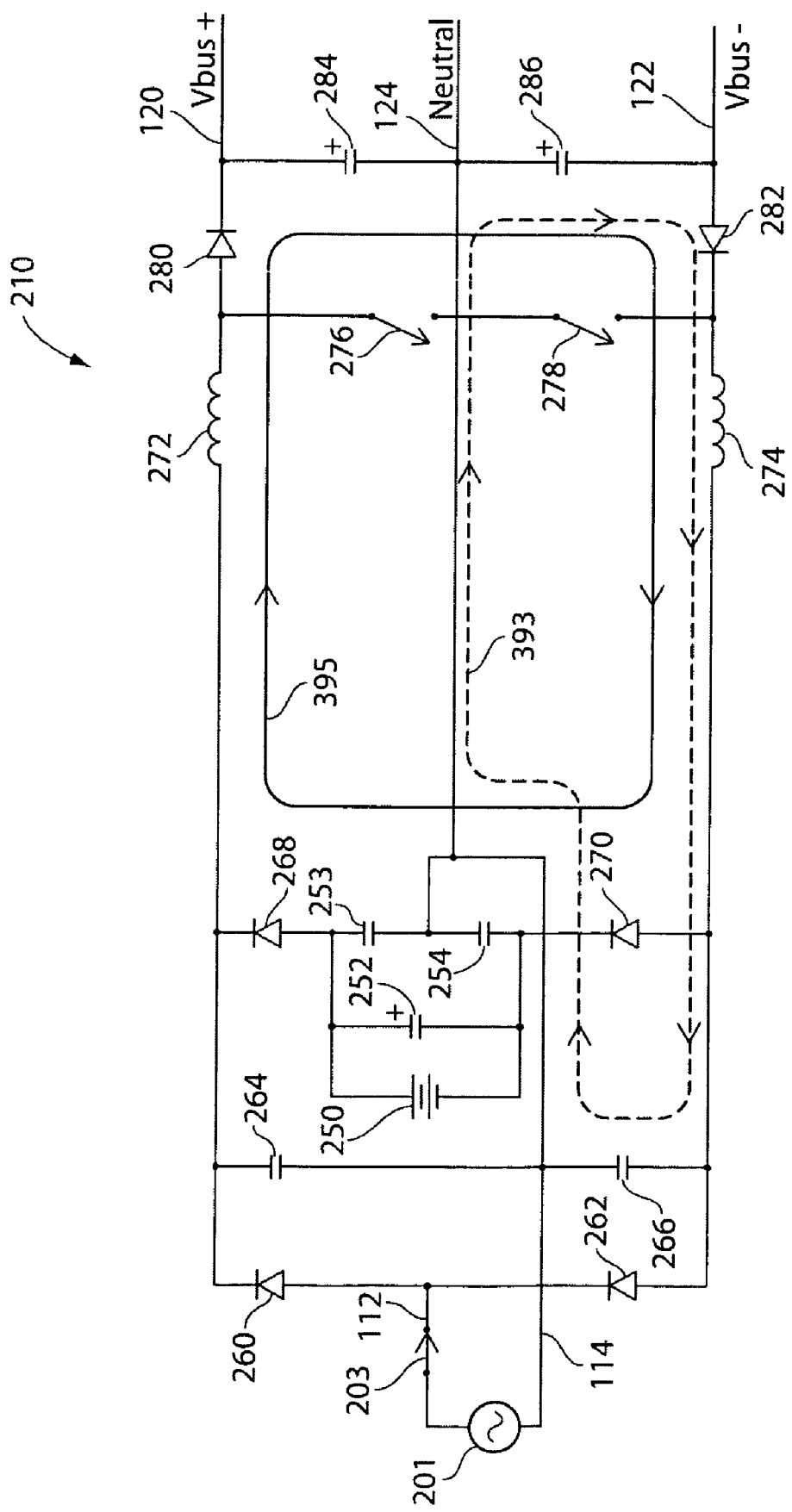

FIGS. 7C and 7D show current paths for simultaneous operation for the negative portion of the input AC voltage waveform. FIG. 7C shows a first AC current path 389 (with dashed lines) and a first DC current path 391 (with solid lines) for simultaneous operation for the negative portion of the input AC waveform with transistors 276 and 278 closed. In this mode, AC current follows a path 389 from the AC source through transistor 278, inductor 274, diode 262 and back to the AC source. In this mode DC current follows a path 391 (which is the same as path 383) from the battery through diode 268, inductor 272, transistor 276, transistor 278, inductor 274, and diode 270. FIG. 7D shows a second AC current path 393 (with dashed lines) and a second DC current path 395 (solid lines) for simultaneous operation for the positive portion of the input AC waveform with transistors 276 and 278 opened. In this mode, AC current follows a path 393 from the AC source through capacitor 286, diode 282, inductor 274, diode 262, and back to the AC source. In this mode DC current follows a path 395 (which is the same as path 387) from the battery through diode 268, inductor 272, diode 280, capacitor 284, capacitor 286, diode 282, inductor 274, and diode 270.

In the operation described above, during positive half cycles of the input voltage waveform, all current drawn by the negative boost circuit is provided by the battery as diode 262 will be blocked by the positive line voltage. Similarly, during negative half-cycles, all current for the positive boost circuit is provided by the battery as diode 260 will be blocked by the negative line voltage. During the positive half cycle, the negative boost circuit controls the DC current being drawn, and the positive boost circuit will draw additional AC current as necessary above the DC current. Similarly, during the negative half cycle, the positive boost circuit controls the DC current being drawn, and the negative boost circuit will draw additional AC current as necessary above the DC current.

Figure 8:
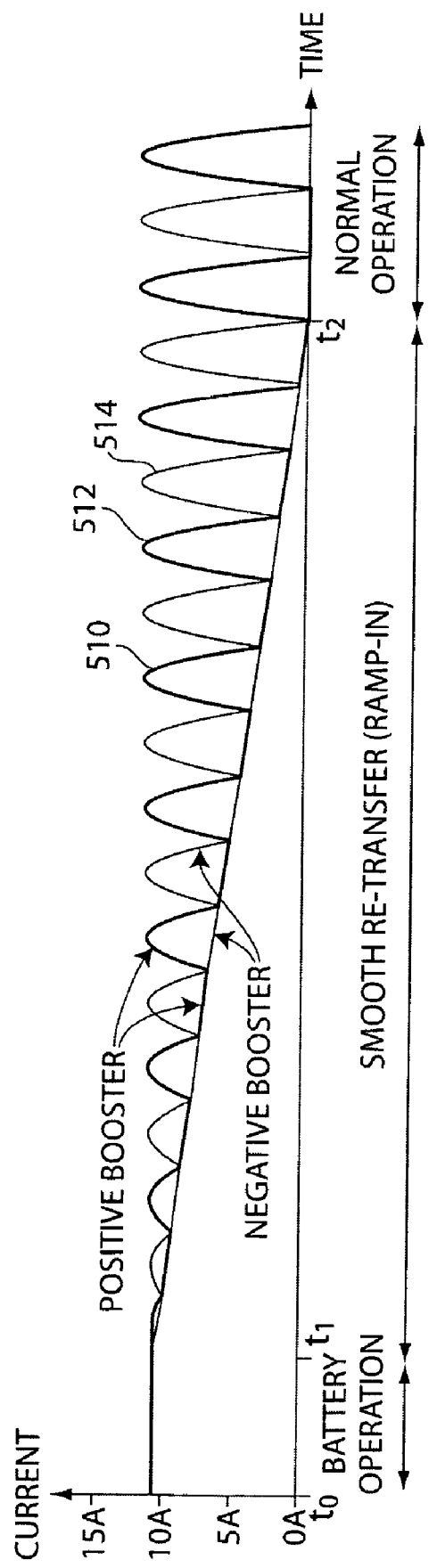
FIG. 8 shows a waveform of current draw in one embodiment.

FIG. 8 shows a waveform 510 of current draw by the boost/rectifier circuit 210 for a transition from battery mode to line mode of operation using simultaneous current draw from the battery and a line source. In the waveform 510, current through the positive boost circuit is shown with a bolder line 512 and current through the negative boost circuit is shown with a finer line 514. During the time period from t0 to t1 in FIG. 8, the boost/rectifier circuit is drawing current from the battery only, during the time period t1 to t2, the boost rectifier circuit is drawing current from both the battery and the AC line, and after time t2, the boost rectifier is drawing current from the AC line only. As indicated by the waveform shown in FIG. 8, the use of simultaneous current draw from two sources provides a smooth transition between the sources. In embodiments described above control techniques for simultaneous current draw have been described for use with boost rectifier circuit 210. As readily understood by those skilled in the art given the benefit of this disclosure, other embodiments of UPS's and boost rectifiers described herein may be similarly controlled for simultaneous current draw from multiple sources.

In embodiments described above, certain circuit components are described as performing certain functions. As readily understood by one of skill in the art, other components or devices may be used to perform the same or similar functions. In particular, relays used in certain embodiments may be implemented by a number of different devices that may be used as switches, including traditional relays, transistors, SCR's and other switching devices. In certain embodiments, transistors are used as switches, for example, in boost circuits. The transistors may be implemented using, for example, IGBTs, MOSFETs, bipolar junction transistors or other devices readily known to those of skill in the art given the benefit of this disclosure.

Table 1 provides specific devices used to implement various components in at least one embodiment of the invention.

TABLE 1

ELECTRICAL COMPONENTS

| Reference No. | Device Name | Value | Man/Part No. |
|---|---|---|---|
| 203 | Relay | 20 A | Various |
| 260 | Diode | 20 A/1200 V | International Rectifier/ 20ETS12 |
| 262 | Diode | 20 A/1200 V | International Rectifier/ 20ETS12 |
| 264 | Capacitor | 5 uF/250 Vac | Various |
| 266 | Capacitor | 5 uF/250 Vac | Various |
| 250 | Battery | 192 V (16 × 12 V) | Various |
| 252 | Capacitor | 1000 uF/250 V | Various |
| 253 | Capacitor | 1 uF/250 V | Various |
| 254 | Capacitor | 1 uF/250 V | Various |
| 268 | Diode | 20 A/800 V | International Rectifier/ 20ETS08 |
| 270 | Diode | 20 A/800 V | International Rectifier/ 20ETS08 |
| 272 | Inductor | 500 uH/15 A RMS | Various |
| 274 | Inductor | 500 uH/15 A RMS | Various |
| 280 | Diode | 15 A/600 V ultra-fast | International Rectifier/ 15ETX06 |
| 282 | Diode | 15 A/600 V ultra-fast | International Rectifier/ 15ETX06 |
| 276 | Transistor | 30 A/600 V | Infineon/ SPW47N60C3 |
| 278 | Transistor | 30 A/600 V | Infineon/ SPW47N60C3 |
| 284 | Capacitor | 4700 uF/450 V | Various |
| 286 | Capacitor | 4700 uF/450 V | Various |
| 291 | Inductor | 2.5 mH/1 A RMS | Various |
| 294 | Inductor | 2.5 mH/1 A RMS | Various |
| 292 | Diode | 4 A/600 V ultra-fast | International Rectifier/ HFA04TB60 |
| 295 | Diode | 4 A/600 V ultra-fast | International Rectifier/ HFA04TB60 |
| 293 | Transistor | 4.5 A/600 V | Infineon/ SPP04N60C3 |
| 296 | Transistor | 4.5 A/600 V | Infineon/ SPP04N60C3 |
| 298 | Transistor | 20 A/600 V | Infineon/ IKP20N60T |
| 299 | Transistor | 20 A/600 V | Infineon/ IKP20N60T |
| 411 | Relay | 20 A | Various |
| 412 | Relay | 20 A | Various |

As discussed above, embodiments of the present invention provide several advantages over prior solutions. In particular, at least one embodiment provides for a dual bus UPS having a single battery that is able to draw a sinusoidal current and provide a power factor approaching unity. In addition, the single battery of at least one embodiment can generally have a greater voltage than in solutions of the prior art, since the battery will not conduct during line mode of operation. At least one embodiment may utilize a battery (or other backup power source) having a voltage that can approach the voltage of one side of the output DC bus. The use of a battery having a higher voltage results in lower battery current allowing lower rated (and lower cost) transistors and inductors to be used. In addition, in comparison with at least some prior solutions, in at least one embodiment of the present invention, losses are reduced as there are no diodes disposed between boost transistors and the neutral of the power supply. Further, in comparison with prior solutions that utilize switching circuits between the battery and the boost circuitry, at least one embodiment of the present invention utilizes simple diodes between a battery and boost circuitry resulting in a simpler, faster, and lower-cost solution.

In embodiments described above, a battery is used as a backup power source. In other embodiments, other AC or DC backup sources and devices may be used including solar powered devices, fuel cells, capacitors, a secondary AC power source, or any other power sources.

In embodiments described above, rectifier/boost circuits are described for use with uninterruptible power supplies. In other embodiments, the rectifier/boost circuits may be used with other power supplies and electronic devices.

In embodiments described above, output voltages are described as being provided at output DC busses. As readily understood by those skilled in the art, the terms bus, busses and voltage rails are not limited to particular types of conductors or wires to provide output voltages and may include any one of a number of devices or components.

Embodiments of the present invention may be used with uninterruptible power sources having a variety of input and output voltages and may be used in single phase or multiphase uninterruptible power supplies.

In embodiments of the invention that utilize a battery as a backup power source, the battery may be comprised of multiple batteries of cells coupled in parallel or in series.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
    a first input having an input line connection and an input neutral connection to receive a first input voltage from a first voltage source;
    a battery;
    a second input to receive a second input voltage from the battery;
    a boost circuit configured to provide a positive output DC voltage with respect to the input neutral connection and a negative output DC voltage with respect to the input neutral connection in both a line mode of operation and a backup mode of operation;
    a first connection circuit to couple the first input to the boost circuit in the line mode of operation; and
    a second connection circuit to couple the second input to the boost circuit in the backup mode of operation;
    wherein the uninterruptible power supply is constructed and arranged to isolate the battery from the input neutral connection in the line mode of operation;
    wherein the boost circuit has a positive input, a negative input and a neutral input, wherein the neutral input is coupled to the input neutral connection, and wherein the second connection circuit includes a first diode coupled between a positive terminal of the battery and the positive input and a second diode coupled between a negative terminal of the battery and the negative input;
    wherein the uninterruptible power supply is configured to operate with an AC voltage source at the first input having a peak AC voltage that is less than the positive output DC voltage, and wherein the battery has a battery voltage that is less than the positive output DC voltage and greater than the peak AC voltage.

2. The uninterruptible power supply of claim 1, further comprising an output circuit coupled to the boost circuit to receive the positive output DC voltage and the negative output DC voltage and to provide an output AC voltage at an output having an output line connection and an output neutral connection.

3. The uninterruptible power supply of claim 2, wherein the uninterruptible power supply is configured to provide an uninterrupted connection from the input neutral connection to the output neutral connection.

4. The uninterruptible power supply of claim 1, wherein the first connection circuit includes at least one relay.

5. The uninterruptible power supply of claim 1, further comprising a first relay coupled in parallel with the first diode and a second relay coupled in parallel with the second diode.

6. The uninterruptible power supply of claim 1, further comprising a battery charging circuit coupled to the battery, the battery charging circuit having a positive charging circuit and a negative charging circuit, wherein the positive charging circuit is configured to charge the battery during a positive portion of the first input voltage, and wherein the negative charging circuit is configured to charge the battery during a negative portion of the first input voltage.

7. The uninterruptible power supply of claim 1, wherein the uninterruptible power supply is constructed and arranged to isolate the first voltage source from the boost circuit in the backup mode of operation and draw current from the battery.

8. An uninterruptible power supply comprising:
    a first input having an input line connection and an input neutral connection to receive a first input voltage from a first voltage source;
    a battery;
    a second input to receive a second input voltage from the battery;
    a boost circuit configured to provide a positive output DC voltage with respect to the input neutral connection and a negative output DC voltage with respect to the input neutral connection in both a line mode of operation and a backup mode of operation;
    a first connection circuit to couple the first input to the boost circuit in the line mode of operation; and
    a second connection circuit to couple the second input to the boost circuit in the backup mode of operation;
    wherein the uninterruptible power supply is constructed and arranged to isolate the battery from the input neutral connection in the line mode of operation;
    wherein the boost circuit has a positive input, a negative input and a neutral input, wherein the neutral input is coupled to the input neutral connection, and wherein the second connection circuit includes a first diode coupled between a positive terminal of the battery and the positive input and a second diode coupled between a negative terminal of the battery and the negative input; and wherein the power supply is constructed and arranged to simultaneously draw current from both the first voltage source and the battery in a combined mode of operation.

9. An uninterruptible power supply comprising:
a first input having an input line connection and an input neutral connection to receive a first input voltage from a first voltage source;
a backup voltage source;
a second input to receive a second input voltage from the backup voltage source;
a boost circuit configured to provide a positive output DC voltage with respect to the input neutral connection and a negative output DC voltage with respect to the input neutral connection in both a line mode of operation and a backup mode of operation; and
means for coupling the second input to the boost circuit in the backup mode of operation and for isolating the backup voltage source from the input neutral connection in the line mode of operation, wherein the means includes a first isolation device coupled to a positive terminal of the backup voltage source and a second isolation device coupled to a negative terminal of the backup voltage source;
wherein the uninterruptible power supply is configured to operate with an AC voltage source at the first input having a peak AC voltage that is less than the positive output DC voltage, and wherein the battery has a battery voltage that is less than the positive output DC voltage and greater than the peak AC voltage.

10. The uninterruptible power supply of claim 9, wherein the backup voltage source is a battery.

11. The uninterruptible power supply of claim 10, further comprising an output circuit coupled to the boost circuit to receive the positive output DC voltage and the negative output DC voltage and to provide an output AC voltage at an output having an output line connection and an output neutral connection.

12. The uninterruptible power supply of claim 11, wherein the uninterruptible power supply is configured to provided an uninterrupted connection from the input neutral connection to the output neutral connection.

13. The uninterruptible power supply of claim 9, further comprising means for isolating the boost circuit from the first voltage source in the backup mode of operation.

14. The uninterruptible power supply of claim 10, wherein the boost circuit has a positive input, a negative input and a neutral input, wherein the neutral input is coupled to the input neutral connection, and wherein the first isolation device includes a first diode coupled between a positive terminal of the battery and the positive input and the second isolation device includes a second diode coupled between a negative terminal of the battery and the negative input.

15. The uninterruptible power supply of claim 14, further comprising a first relay coupled in parallel with the first diode and a second relay coupled in parallel with the second diode.

16. The uninterruptible power supply of claim 10, further comprising means for charging the battery.

17. An uninterruptible power supply comprising:
a first input having an input line connection and an input neutral connection to receive a first input voltage from a first voltage source;
a backup voltage source;
a second input to receive a second input voltage from the backup voltage source;
a boost circuit configured to provide a positive output DC voltage with respect to the input neutral connection and a negative output DC voltage with respect to the input neutral connection in both a line mode of operation and a backup mode of operation;
means for coupling the second input to the boost circuit in the backup mode of operation and for isolating the backup voltage source from the input neutral connection in the line mode of operation, wherein the means includes a first isolation device coupled to a positive terminal of the backup voltage source and a second isolation device coupled to a negative terminal of the backup voltage source; and
means for simultaneously drawing current from both the first voltage source and the backup voltage source in a combined mode of operation.

18. The uninterruptible power supply of claim 17, wherein the backup voltage source is a battery.

19. A method of providing power to a load, the method comprising:
receiving input power at a line connection and a neutral connection from a first voltage source;
rectifying the input power to produce a first rectified voltage at a first node during a positive portion of an input voltage wave and a second rectified voltage at a second node during a negative portion of the input voltage wave;
in a line mode of operation, producing a positive DC voltage with respect to the neutral connection from the first rectified voltage and a negative DC voltage with respect to the neutral connection from the second rectified voltage;
coupling a second voltage source to the first node and the second node using a connection circuit that is configured to isolate the second voltage source from the neutral connection in the line mode of operation, wherein coupling a second voltage source includes coupling a first isolation device between the second voltage source and the first node and coupling a second isolation device between the second voltage source and the second node; and
simultaneously drawing current from both the first voltage source and the second voltage source in a combined mode of operation.

20. The method of claim 19, wherein the second voltage source is a battery, and wherein the method further comprises:
detecting an outage of the first voltage source;
producing the positive DC voltage and the negative DC voltage from a voltage of the battery in a backup mode of operation.

21. The method of claim 20, further comprising producing an output AC voltage from the positive DC voltage and the negative DC voltage in both the line mode of operation and the backup mode of operation.

22. The method of claim 21, further comprising isolating the first voltage source from the first node and the second node in the backup mode of operation.

23. The method of claim 19, wherein the second voltage source includes a battery, and wherein the method further includes charging the battery in the line mode of operation.

24. The method of claim 19, wherein the second voltage source is a battery.

* * * * *